US008214380B1

(12) United States Patent
Bettinger et al.

(10) Patent No.: US 8,214,380 B1
(45) Date of Patent: Jul. 3, 2012

(54) SYSTEM AND METHOD FOR MANAGING SEARCH RESULTS

(75) Inventors: Jon S. Bettinger, Rossmoor, CA (US); Alex T. Yamane, Pasadena, CA (US)

(73) Assignee: Repio, Inc., Newport Beach, CA (US)

( * ) Notice: Subject to any disclaimer, the term of this patent is extended or adjusted under 35 U.S.C. 154(b) by 332 days.

(21) Appl. No.: 12/702,238

(22) Filed: Feb. 8, 2010

Related U.S. Application Data

(60) Provisional application No. 61/150,973, filed on Feb. 9, 2009.

(51) Int. Cl.
*G06F 7/00* (2006.01)
(52) U.S. Cl. ...................................................... 707/758
(58) Field of Classification Search .................. 707/758, 707/705, 609
See application file for complete search history.

(56) References Cited

U.S. PATENT DOCUMENTS

| 7,181,459 B2 | 2/2007 | Grant et al. |
| 2006/0129530 A1* | 6/2006 | Beavers et al. ................... 707/3 |
| 2008/0313156 A1* | 12/2008 | Hirahara ........................... 707/3 |

* cited by examiner

*Primary Examiner* — James Trujillo
*Assistant Examiner* — Soheila Davanlou
(74) *Attorney, Agent, or Firm* — Advantage IP Law Firm

(57) ABSTRACT

A system and method for managing search results available from a network resource using a data feed is disclosed herein as incorporating a processor programmed to retrieve user unsorted search results matching search terms provided by a user, transmit the search results along with a user selectable sorting identifier over the network for display on a graphical user interface and further programmed to sort each search result according to the user selected sorting identifier, update the sorting status of each search result, and transmit for display on the graphical user interface the search results in accordance with the sorting status and the user selected sorting identifier.

19 Claims, 15 Drawing Sheets

Category Lookup Table: —232

Prime Categories —256
  ME (This is Me) —258
  NOT ME (This is Not Me) —260
Secondary Categories —262
  Correct and Current —264
  Correct but unsolicited —266
  Outdated but authorized —268
  Incorrect but authorized —270
  Outdated and unsolicited —272
  Outdated and unauthorized —274
  Incorrect and unsolicited —276
  Disparaging or defaming —278
  Copyright infringement —280
  Other Condition —282
  Remove (Takedown Candidate) —284

*FIG. 5*

User Profile Table: —230
User First Name: —234
User Last Name: —236
City: —238
State: —240
Country: —242
Photo Image Link: —244
Profile: —246
User Account Code: —248
Authentication Code: —250
Biblio Page Link: —252
Email Address: —253
Password: —255
Biblio Comments: —257
Public View (Y/N): —259

*FIG. 4*

Web Resource Management Data Table: —291
Web Resource Unique Identifier: —292
Web Resource Short Title: —294
Web Resource Short Description: —296
Web Resource URL (link): —298
Web Resource IP address: —300
Web Resource DateTime Stamp: —302
Web Resource Prime Category (N/US, Me/Not Me): —304
Web Resource Secondary Category: —306
Web Resource Content Snapshot: —308
Web Resource Order/Ranking: —314
Web Resource Remove/Change Indicator: —316
Web Resource Comments: —318
Positive/Negative Indicator (Checkmark, X): —320
User Account Code: —248
Search Term Code: —295

*FIG. 6B*

Search Term Data Table: —290
Search Term Code: —293
Search Term (e.g. first name, last name): —295
Search Term Included Keywords: —297
Search Term Excluded Keywords: —299
Web Resource Category Display Indicator: —301
User Account Code: —248

*FIG. 6A*

442 — This is Me -> Add My Own Link

Please enter the form below for a website link you would like to add to this search term as "this is me".

◂ return to "this is me" links

Title: _____ 496

Web Address: _____ 498

This link is:
- ○ Correct and Current
- ○ Correct but Unsolicited
- ○ Outdated but Authorized
- ○ Incorrect but Authorized
- ○ Outdated and Unsolicited
- ○ Outdated and Unauthorized
- ○ Incorrect and Unsolicited
- ○ Disparaging or Defaming
- ○ Copyright Infringement
- ○ Other

500

[submit] — 502

494

492

FIG. 13 ial or business entity over a large scale network environ-
SYSTEM AND METHOD FOR MANAGING SEARCH RESULTS This application claims the benefit of U.S. Provisional Application No. 61/150,973, filed on Feb. 9, 2009, and which is hereby incorporated by reference in its entirety.

BACKGROUND

1. Field of the Invention

The present invention relates to systems and methods for managing search results, particularly those involving digital content and/or references to physical objects or devices with a network identification or links, and more specifically, to proactively managing a bibliography of such content or references as, for example without limitation, search results that may match, relate or refer to, or implicate the reputation, branding, or other user defined criteria relating to an individual or business entity over a large scale network environment.

2. Background

With the ever expanding universe of digital content on the World Wide Web (WWW, Internet, the network, or Web) coupled with generous freedom of expression principles, the occurrence and frequency of content and/or network identifiable physical objects referencing or pertaining to an individual, even private individuals, is becoming more widespread. Of course, the presence of such content is exponentially greater for public figures and businesses. Adding to this, more and more content is piled on the network each day due to the ease and speed of digital formatting and submission methods and the increasing access to the Web by more and more network connected physical objects, devices and users every day. Given the significant amount of time it takes to build up a positive reputation and that only moments may be needed to ruin it, tools for managing online reputation are becoming increasingly important for both individuals and businesses.

With the vast amount of digital content as well as network identifiable physical objects on the Web, the likelihood of encountering references associated with a particular name or brand that disparage and/or generate sufficient negative publicity such that the reputation of the individual or business entity associated with the name or brand is impacted in a negative manner is of real concern. These reputation harming references encompass a wide range of activities such as posting embarrassing confidential information or images to unfair commentary about a competitor's product to critical scathing reviews about an experience with a business service online. While this remains a concern where the attacks are warranted, an even bigger concern arises when such attacks are unwarranted, unauthorized, unsubstantiated, disparaging, false, libelous, taken out of context, or merely posted in jest or poor taste. The posting of remarks, images, video clips, sound bytes, and other media content bearing such reputation harming commentary about an individual or business entity may cause significant harm to the reputation of the individual or business entity. Such negative publicity may be even more egregious given the anonymity of a Web that favors unregulated commentary and wherein website hosts controlling the postings commonly elect not to police the content submissions or are not required to, except in limited circumstances. Related to this, in many instances, there is no opportunity for the individual to respond or to present one's case in a more orderly and more truthful light. Thus, even when caught, many improper references to an individual or business go unchallenged and remain in the realm of the Web to appear on command every time a search is conducted. As is readily apparent, the difficulty of monitoring such references and lack of an adequate avenue for responding presents significant difficulties in managing and repairing one's reputation online.

The failure to manage one's reputation, or search results or other digital content listings related thereto, may have serious consequences as more and more college recruiters, prospective employers, and other information prospecting entities looking for positive or negative ("red flag") references conduct their own due diligence and/or hire a third party to search for content that would raise a red flag regarding an individual or business entity. Since such information prospectors do not have the time to thoroughly investigate or even peruse every remark to determine whether it applies to the individual or not, and thus inapplicable remarks may be considered. If the information is sufficiently negative, the applicant may not even have an opportunity to explain the situation as the hiring or recruiting party will quickly look elsewhere.

Related to this, the order in which the information is presented is often at the mercy of the search and presentation logic of a conventional search engine. While such search engines typically attempt to present information that is current and has a higher probability of matching the search terms, there is a distinct possibility that the recruiter or employer will only read a few links from the top of the list and stop there given time constraints. These links may be of little importance to the determination of the suitability of the applicant.

As a related problem, much of the content referencing an individual or business entity is outdated yet remains accessible to search engines. This clutters up the network by taking up storage space, taking up unnecessary bandwidth during searches, and slowing down search engines that may have otherwise ignored the reference. The opportunity to locate and comment on these references and request their removal from a centralized platform is currently lacking.

Given the foregoing, and in light of the expanding presence of the court of public opinion into the online community, managing online content relating to or referring to an individual or business, or even ensuring unrelated content is marked accordingly, is becoming increasingly important. Early efforts such as posting responses to negative commentary, requesting removal of certain postings from a website host, and publishing more positive references to drive down negative listings in the search engines were decentralized and required the complainant to review an ever growing number of resources from multiple sites, a daunting task given the amount of content on the Web. Also, such approaches commonly did not address issues such as removing content from the web, particularly old out of date content as this is commonly left to the search engines to filter down based on lesser matching probabilities and older content currency on the results page listing. Furthermore, even for removed content, much of this content remains stored on cached pages, and, even if deleted from the source, remains accessible over the Web. In addition, such prior efforts did not satisfactorily address removing unauthorized, misleading, disparaging, or unrelated content.

More recent attempts have been directed at increasing some control of one's reputation by aggregating information about a specific person, usually through publicly available social network pages and email address matchings, and then further offering certain automations for presenting pages with similar matching names to an individual. However, the currency of the information gathered in these attempts at reputation management is not addressed and instead the content located is merely assumed to be sufficient to create a personal profile. Worse than that, such processes frequently include pages the person being published about has not authorized or approved. Thus, it lumps into a personal profile those pages that may have nothing to do with the individual.

While some of these earlier tools allow a user to address a few aspects of reputation management such as presenting a listing of sites, both related and unrelated to the user, they are typically cumbersome, decentralized, less than comprehensive, and offer very little functionality of that over a conventional search engine. More critically, none of these services enable a user or business entity to proactively manage a listing of content through a centralized system that combines identification, filtering, sorting, and commentary processes to enable an individual or business entity to publish to the world a listing of web resources approved, ordered, and commented upon by the person or business entity being mentioned on the resource.

Thus, there exists a need for a system and method that performs such processes in spite of the ever-expanding universe of content. Such a system would allow an individual or business entity to take control of an associated name and/or brand using a centralized system and then present to the public a viewable, approved, commented upon, and ordered set of content links pertaining to the individual or business entity or other user defined criteria. In addition to assisting in the management of one's own reputation in an online environment, such a system may also assist third party college recruiters, employers, and other information seekers looking for pertinent references before making a personal involvement, recruiting, hiring, or business decision and be used to facilitate the removal of out of date content as well.

SUMMARY

In accordance with the principles of the present invention, a preferred embodiment of a system for managing search results available from one or more digital content resources using one or more data feeds accessible over a network having at least one graphical user interface may include a network interface, at least one processor coupled to a memory, with the processor, in response to receipt of a user defined search terms, being programmed to retrieve one or more search results matching at least one user provided search term, assign the search results a user unsorted status, transmit for display the search results along with a user assignable primary sorting identifier, and, upon receipt of at least one primary sorting identifier from the user for at least one search result, revise the user unsorted status of the corresponding search result to a user sorted status, and transmit a revised display of the search results in accordance with the corresponding status and user assigned primary sorting identifier for display on the user's graphical user interface thereby providing the user with additional control of the publication of the search results.

In another feature of the present invention, a database may be used to store a baseline set of search results and subsequent sets of search results and, where differences are determined, the system may notify the user that new search results are available for sorting.

Another aspect of the present invention enables the user to order or rank and/or comment upon each search result from improved publication of the search results.

In yet another feature of the present invention, additional user assignable secondary sorting identifiers may accompany the search result transmission, either as standalone identifiers or as subsets of the primary sorting identifier, thereby allowing the user even greater control of the publication of the search results in accordance with all sorting identifier assigned by the user to each search result.

Other aspects of the present invention include the use of an authentication code prior to obtaining search results and allowing exclusionary search terms to enhance the search request.

A method for using the system is also disclosed herein.

Other aspects of the present invention will become apparent with further reference to the following drawings and specification.

BRIEF DESCRIPTION OF THE DRAWINGS

FIG. 4 is a schematic representation of an exemplary user account profile table stored in the database illustrated in FIG. 1;

FIG. 5 is a schematic representation of an exemplary category lookup table stored on the database illustrated in FIG. 1;

FIG. 6A is a schematic representation of an exemplary search term data table stored in the database illustrated in FIG. 1;

FIG. 6B is a schematic representation of an exemplary web resource management data table stored in the database illustrated in FIG. 1;

FIG. 13 is an exemplary screen shot of a form for adding user defined search results to the search results listing prepared by the RMS of FIG. 1;

DETAILED DESCRIPTION OF THE PREFERRED EMBODIMENTS

In general terms, a system and method for proactively managing information available as digital content, or references to physical objects or devices with a network identification or link, such as that commonly available over a large scale network, may be generally accomplished by initially identifying a set of web resources on the network having content relevant to selected key search terms, using available network data feeds and processing the results with the search result management system exemplified herein. In one application described herein, web resources that may impact an individual's or business entity's reputation or brand online are identified. Once the initial search results are obtained, the system enables a user to sort the results by relevance and then assign a determinative categorization of the relevant content as it may impact the reputation or branding of an individual or business entity (or other user defined criteria) either in a positive/negative, relevant/irrelevant, or approved/disapproved manner, other user defined categorization. The system further provides a commentary and ranking procedure that, when combined with the categorization procedures, produces a pertinent, current, approved, ordered, and commented upon bibliography of web resources. Having prepared the bibliography using the search result management system, the user may selectively make the bibliography publicly accessible over the network and/or through other avenues of publication for use by such information gatherers or reviewers as college recruiters, employers, human resource mangers, and other information seekers and managers.

The core of the system is a search result management system that gathers, filters, categorizes, and further enables review and commentary on and ranking of a baseline set of web resources yielding search results particular to a set of key search terms, also referred to as mentions, resulting in a user approved bibliography. Once the baseline set of web resource listings is established, a periodic monitoring and alert service may be used to notify the user of updates that may need further processing by the reputation management system and incorporation into the bibliography. In the exemplary embodiment described below, the system may be offered over an Internet website on a free or subscription basis with account creation and user authentication functions enabling access to a reputation management program stored on at least one server provided by the system to a local or remote users having a display, an input device, and web browsing software.

Figure 1:
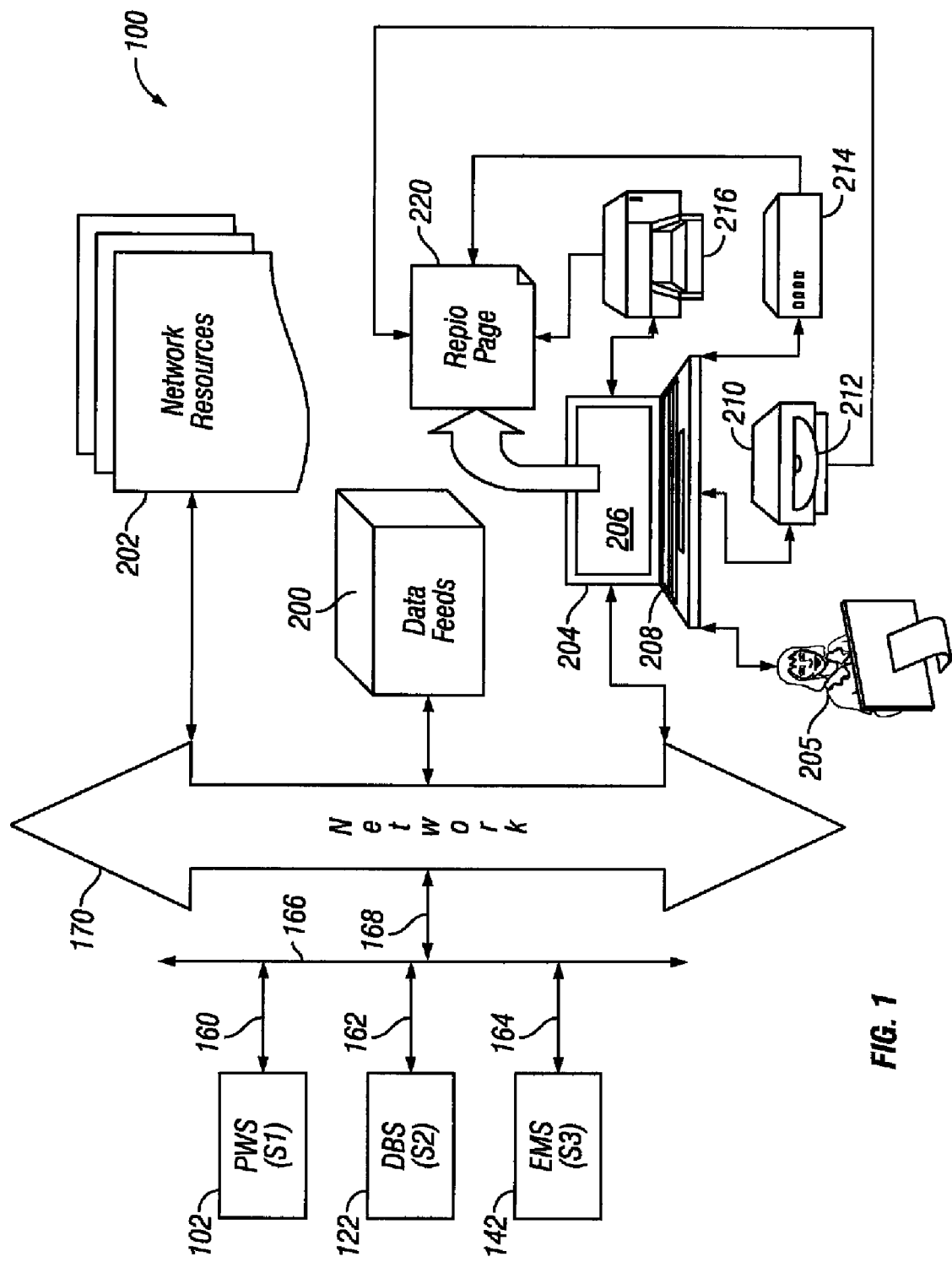
FIG. 1 is an overview block diagram of an exemplary reputation management system (RMS) in accordance with the present invention.
Figure 2:
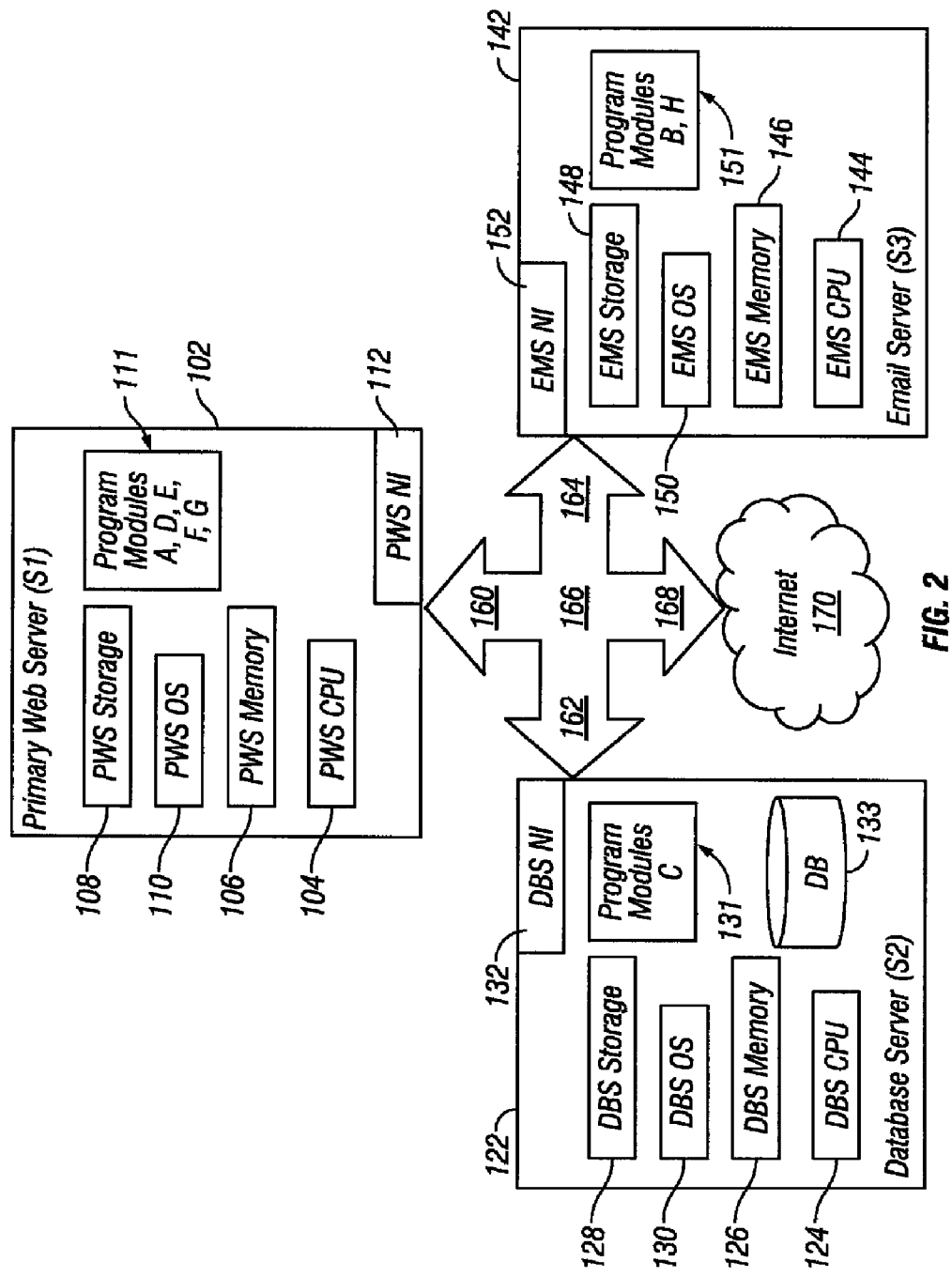
FIG. 2 is an expanded view of the server side components illustrated in FIG. 1.

Referring now to FIGS. 1-2, an exemplary system for managing search results, generally designated 100, in accordance with the present invention will now be described in more detail. The search results management system 100 will also be referred to herein as a reputation management system (RMS) as a primary exemplary application described herein is in terms of managing reputation related search results, digital content listings, or links. It will be appreciated, however, that the search results management system may be applied to other user based criteria inclusive of or exclusive to reputation or brand related search terms.

In this exemplary embodiment, the search results system 100 is implemented in a server-client network environment. There are three servers cooperating to provide a web site operable to present one or more interactive display screens that are accessible over the network by client side devices such as personal computers, laptops, cell phones, PDAs mobile computing devices, and other conventional web browsing devices having web browsing software, a graphical user interface (GUI), an input device, and access to the network. In response to search terms provided by the user (or user's agent or third party), the RMS 100 enables the user to prepare a selectively managed compilation of web resource listings matching the user defined search terms and further enabling the selective application of categorization criteria by the user to generate a compilation of such user managed web resource listings, also referred to as the bibliography or bibliography page throughout this description.

Server 1 (the Primary Web Server):

With continued reference to FIGS. 1-2, the search result (or reputation) management system 100 includes a 1U rack mounted Primary Web Server (PWS) 102 with an Intel Pentium IV processor (CPU) 104 rated at 3.0 GHz in communication with a memory 106 (ROM and 2 GB RAM), at least one 250 GB hard drive storage device 108 for storing an operating system (OS) 110 and a set of program modules generally designated 111, and a network interface (NI) 112.

Server 2 (the Database Server):

Further included in the reputation management system 100 is a Database Server (DBS) 122 for handling the primary database duties of the system. The DBS is also of the 1U rack mounted variety, and is constructed similarly to the PWS with an Intel Pentium IV processor 124 also rated at 3.0 GHz that is in communication with a memory 126 (ROM and 2 GB of RAM), at least one 250 GB hard drive storage device 128 for storing an OS 130 and a set of program modules generally designated 131, and a programmable database 133, and a NI 132.

Server 3 (the Email Server and Secondary Web Server):

Continuing with FIGS. 1-2, the third server in the reputation management system 100 is an Email Web Server (EMS) 142 for handling primary email duties along with back up and secondary web server duties to the PWS 102. The EMS is also of the 1U rack mounted variety, and includes an Intel Quad Core Q6600 processor 144 rated at 2.4 GHz in communication with a memory 146 (ROM and 4 GB of RAM), a pair of Western Digital hard drives, each with a 750 GB capacity and collectively designated 148 for storing an OS 150, a set of program modules, generally designated 151, and also in communication with a NI 152.

In the PWS 102, DBS 122, and EMS 142, the respective storage device 108, 128, 148 is preferably an internal hard disk drive but a suitable external or removable storage device may be used. The NIs 112, 132, 152 for each server is a network interface card (NIC) such as a 10/100 Ethernet Network Card. Exemplary servers having the above described characteristics are available from ServersDirect.com or other server hardware vendors.

In this exemplary embodiment, the OS stored in each server 102, 122, and 142 is a Microsoft Windows 2003 Server based OS but other suitable OS's such as a Linux, Unix, or a Mac based OS may be used. Each server also includes a conventional power source (not shown) for providing electrical power to the server components. For ease of description communication lines between server components have not been shown but such construction would readily be understood by one skilled in the art. Moreover, while it is preferable to use multiple servers with somewhat dedicated tasking, it will be appreciated that one or more servers incorporating all of the server side system components and providing the requisite functionality described herein may be used.

Inter-Server and Network Connectivity:

Still referring to FIGS. 1-2, the PWS 102, DBS 122, and EMS 142 may communicate using a conventional network setup such as represented by network lines 160, 162, and 164 connected to a primary network line 166 in which transmissions (command and data traffic) can issue back and forth between servers. In turn, the collective server network is connected via a conventional network line 168 to a global network 170 (Internet) using their respective NICs 112, 132, 152 and associated cabling connected to a network firewall and router may access the Internet via a Tier 1 Internet backbone co-location provider. Preferably, a high bandwidth, high availability network connectivity (such as an OC-3 level capacity or higher) shall be used to establish links between the servers and the global network 170 although other suitable connections as would be understood by one of ordinary skill in the art may be used.

Figure 3:
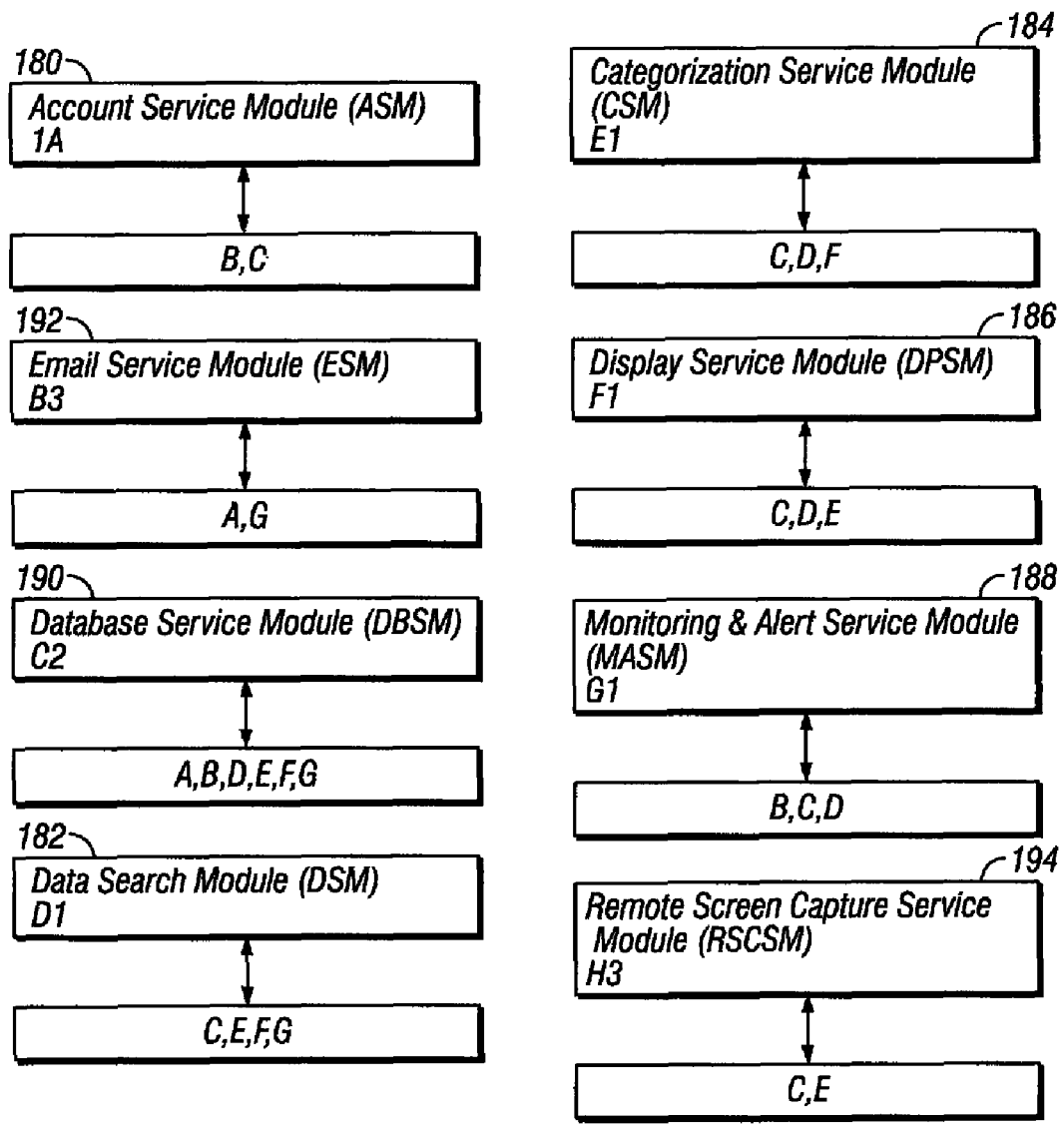
FIG. 3 is a block diagram of a set of exemplary programming modules for executing the RMS shown in FIG. 1.

The Reputation Management Program Modules (General):

With continued reference to FIGS. 1-3, the computer program modules collectively designated 111, 131, 151 and stored on the hard drive 108, 128, and 148 of each server PWS 102, DBS 122, and EMS 142, respectively, provide instructions to be executed by the respective CPU's 104, 124, 144 to provide the functions and processes of the reputation management system 100. The PWS set of modules 111 includes an Account Service Module (ASM) 180, a Data Search Module (DSM) 182, a Categorization Service Module (CSM) 184, a Display Service Module (DPSM) 186, a Monitoring and Alert Service Module (MASM) 188. The DBS 122 set of modules 131 includes a Database Service Module (DBSM) 190 while the EMS 142 set of modules 151 includes an Email Service Module (ESM) 192 and a Remote Screen Capture Service Module (RSCSM) 194. In this exemplary embodiment, each module is programmed in CFML and is created to run on the Abode Coldfusion 8 application server but other CFML application servers such as Railo, BlueDragon, Ignite Fusion, Smith Project or Coral web would be suitable. The modules may also be translated to other application servers such as Microsoft ASP.NET, JavaServer Pages or PHP.

The functionality of the modules 111, 131, and 151 will be discussed in more detail below along with the database 133 stored on the hard drive 128 of the DBS 122 after describing the resources available over the Internet 170 used by the reputation management system 100 along with the client side components for using the reputation management system.

Data Feeds:

With reference to FIG. 1, accessible over the Internet 170 to the servers PWS 102, DBS 122, and EMS 142 is one or more data feeds 200, typically XML-based APIs, that encompass conventional search engines and other reporting tools that sort through online content and network identifiable physical objects using conventional search techniques to present a listing of the results. Preferably, such results include some sort of network location identifier such as a uniform resource identifier (URI), uniform resource locator (URL), or uniform resource name (URN), commonly referred to as a link, however, this is not necessary. Exemplary data feeds that may acquire content for the reputation management system 100 include the Yahoo BOSS search engine feed, Microsoft's Bing.com search engine, Google's search engine, Google Blog Search, Google News search, Technorati tag search, del.icio.us tag search, Flickr tag search, MSN search, MSN News search, Yahoo search, Yahoo News search, Summize search, Icerocket search, Topix.net search, Feedsfarm.com search, Newspad PR Web search, Blogdigger search, Plazoo search, Blogmarks tag search, Find articles search, and Wired News search. Custom RSS feeds created by the user 205 on third party websites or other Internet based resources may also be used as a data feed source. Other suitable conventional data feeds may be integrated as well into the reputation management system 100 and the RMS 100 may incorporate its own search engine techniques in support of the RMS processes.

Network Resources:

Also accessible over the Internet 170 to both the RMS 100 and the data feeds 200 are network resources 202. Network resources may be summarized as any personally identifiable information (the online footprint) that collectively forms an individual's overall online reputation, or footprint relating to other user defined criteria. This online footprint may include single or multi-media contents such as images, videos and video clips, audio files and sound bytes, and/or messages/comments referring to one's name or other keywords or criteria selected or provided by the user. The following types of data commonly contribute to this online footprint and may be considered network resources 202:

a) blog entries as well as blog comments;

b) comments on social media sharing sites such as Flicks, YouTube, Metacafe, Vimeo, Facebook, MySpace, Friendster, Hi5, MSN Spaces, etc. (including photos, videos, audio recordings, podcasts, etc.);

c) comments and message posted on social networking and rating sites such as Yelp, Facebook, MySpace, Twitter, Friendster, Amazon, EBay, etc.;

d) online magazine and news articles;

e) online versions of electronic documents such as PDF (Adobe), Word, Excel files). It will be appreciate that search indexes such as Google will actually scan the content of PDF files and make them available to search as HTML pages;

f) photos tagged with a user's name or associated with a user's name;

g) news articles from news feeds such as Google News, MSN News, Wired News, Yahoo News, etc.;

h) web addresses to pages shared on web content discovery and rating sites such as StumbleUpon or Del.icio.us;

i) any data transmitted through Twitter.com, Yammer.com or other micro-blogging services; and i) references to any network (local, wide area, or the Internet) identifiable device or physical object, including, but not limited to, household appliances, network devices, inventories, medical devices, utilities, and any searchable devices with a network address or having a digital (virtual) representation on the network.

This list is not meant to be exhaustive and other network resources 202 accessible to the conventional data feeds 200 will occur to those skilled in the art. The data feeds are operable using conventional data feed techniques to search out and retrieve one or more of these network resources 202 that contribute to the online footprint. A compiled listing of these network resources as returned by the data feeds typically provides an initial working set or footprint based on the user's search terms or other user defined criteria. However, this initial footprint provided by the data feeds typically is too broad in scope and often includes information that is not part of an individual or business entity footprint. The RMS 100 provides the functionality to the user for further refinement of the data feed results (or search results) culminating in a user approved bibliography 220 as will be described below.

Clients:

With continued reference to FIG. 1, also accessible via the Internet 170 is a client (remote or local) side browsing device 204 such as a laptop, netbook, desktop computer, cell phone, smartphone, personal digital assistant (PDA), or other conventional computing or telecommunication device having web browsing capabilities and access for use by an end user 205. The client side device includes a user interface 206, preferably a GUI such as a display screen, and data entry input device 208, such as a keyboard, keypad, touchpad, microphone combined with a voice recognition program, mouse, head tracking device, or other conventional data entry device suitable for entering data into a web browser. Any display screen capable of displaying web pages would be suitable. The client 204 may also include an optical disc writer 210 such as a CD-RW or DVD-RW for recording digital data onto an optical disc 212. A memory storage device 214 such as a hard disc drive or flash drive, either internal or external is also connected and in communication with the remote browsing device. Such memory storage device may be removable if desired. A printing device 216 such as an inkjet or laser printer may also be in communication with the computing device, either through a wired connection or wirelessly, to print out hard copies of the approved bibliography 220 as will be discussed below. The printer provides an alternative to displaying the bibliography on the GUI or recording the bibliography onto the optical disc or memory storage device.

The Database:

As mentioned above, the database 133 (FIG. 1) is stored on the memory storage device 128 of the DBS 122. In this exemplary embodiment, the database is a programmable relational database. The Microsoft SQL Server 2005 using MS-SQL query language with its ability to manage XML data has been found to be a suitable database relationship management system. In general terms, the database is constructed to interact with the program modules 111, 131, and 151 to create and modify one or more data tables such as the user profile date table 230 (FIG. 4), the category lookup table 232 (FIG. 5), the search term data table 290 (FIG. 6A), and the web resource management data table 291 (FIG. 6B) to support the generation and display of the RMS process display screens (FIGS. 8-15), including the bibliography 220, a listing of web resources matching one or more search terms and managed by the user 205 as shown for example in FIG. 15.

Referring now to FIGS. 4-5, representations of a sample user profile or user account data table 230 and a category lookup data table 232 stored in the database 133 are illustrated. Both are exemplary and not meant to be limiting in any manner and additional data may be stored in either table to support the RMS process. The user profile data table includes the following data slots for storage and retrieval by one or more of the program modules 111, 131, 151: a user first name data slot 234, a user last name data slot 236, a user city data slot 238, a user state data slot 240, a user country data slot 242, a user photo image data slot 244, a user profile data slot 246, a unique user account code data slot 248, a unique user authentication code data slot 250, a bibliography page link data slot 252, an email address data slot 253, a password data slot 255, a bibliography comments data slot 257, and a public view indicator data slot 259. The data stored in this table may be used to support the generation of a user account profile page 340 (FIG. 8), the user account edit page 510 (FIG. 14), and the bibliography page 220 (FIG. 15). The user account code 248 is used to relate the search term table 290 and web resource management data table 291 to user profile data table 230 such that search term related processes and web resource management processes may be linked to a particular user 205.

Also stored in the database 133 is the category lookup data table 232 for retrieving categories to be assigned to search results by the user 205 to assist the user in managing the web resource listings 220. The category lookup data table includes two prime categories (or sorting identifiers), collectively designated 256. This prime category is used to perform an initial sort of the web resource listings or search results (e.g. 416*a-e* in FIG. 9) resulting from a search performed by the data feeds 200 based on search terms 295, 297, 299 (FIG. 6A) input by the user or the user's agent into the RMS 100. In this exemplary embodiment, assuming the search terms 295 are likely to include the user's first name and user's last name, the user assignable prime categories are split into a first category entitled ME (or This is Me) category 258, used for indicating web resources 202 that pertain, reference, or are somehow relevant to the user's search terms, and the second prime category is entitled NOT ME (or This is Not Me) category 260, used for indicating web resources that do not pertain, do not reference, or are irrelevant to the user's search terms. This prime category set 256 is used to separate out irrelevant web resources and create a working "ME" set of web resources relevant to the user 205 for further processing.

It will be appreciated that other prime categories 256 may be used and that the main application of the prime category set 256 is to provide an initial user (or user's agent or third party) management filter on the search results returned from the data feeds 200 based on the search terms 295 (or other user defined criteria) provided by the user 205 to the RMS 100. Other prime category sets contemplated include: Mention/No Mention to be applied to web resource listings (search results) mentioning or not mentioning the search terms, Reference/No Reference to be applied to web resource listings referencing or not referencing the search terms, Same/Similar Name to be applied to web resource listings including only the same user name search terms or including names similar to the search terms, and Relevant/Irrelevant to be applied to web resource listings that are relevant or irrelevant to the search terms, My Brand/Not My Brand to be applied to web resource listings pertaining to or not pertaining to the brand related search terms, and Approved/Disapproved to be applied to web resource listings approved or disapproved by the user as they relate to the search terms or other user defined criteria. Another prime category set contemplated may be New(or Unsorted)/Sorted to be applied to search results that have or have not been sorted by the user 205. It will be appreciated that a "New" web resource listing may not have been previously been presented to a user while an Unsorted web resource listing may have been previously presented to a user but not yet acted upon (categorized or sorted).

Building on this prime category 256 filter application, an agent or third party based prime category may be used. For example, a prime category set such as This is Client/This is Not Client to be applied to web resource listings relating or not relating to a user's client, This is my Relative/This is Not My Relative to be applied to web resource listings relating to or not relating to the user's relative may be used, or I Agree (or I Sponsor or I Approve)/I Disagree (I do not Sponsor or I Disapprove) to be applied to web resource listings that a third party may offer an opinion on may be used. Other user defined prime category sets will occur to one of ordinary skill in the art. More than two prime categories or sorting identifiers may be used as well to perform the initial or subsequent sort of the search results into two or more working sets of search results as determined by the user for further managing the search results.

With continued reference to FIG. 5, the category lookup data table 232 also includes a secondary category (or sorting identifier) grouping, collectively designated 262, that includes the following exemplary categories: Correct and Current 264, Correct but Unsolicited 266, Outdated but Authorized 268, Incorrect but Authorized 270, Outdated and Unsolicited 272, Outdated and Unauthorized 274, Incorrect and Unsolicited 276, Disparaging or Defaming 278, Copyright Infringement 280, Other (or user defined) Condition 282, and Remove (Takedown Candidate) 284. Each category is fairly self-explanatory but a brief description is preferably made available on the RMS web site to guide the user when applying the secondary categories. Other likely assignable categories or sorting identifiers including such identifiers as: Professional, About Me, My Comments, Other Mentions, as well as by network resource type such as Web Page, Media, Text, Video, Images, and Audio, for example. By assigning a Prime Category 256 and a Secondary Category 262 to a network resource 202, the user 205 may take greater control of his or her or its reputation online or manage search results or digital content listings or links according to user preferences as opposed to how such results are delivered or displayed by the data feeds. Another exemplary category (either Prime or Secondary) may be based on time or currency to ferret out outdated content. Other categories contemplated are those that may be useful for assembling an auto-biography or biography, resume, obituary, will and other factual recitations in support of a related activity.

The secondary categories 262 may be supplemented by a visual checkmark or "X" to provide visual cues as to whether the web resource listing in question is a positive reputation building item or not. In general terms, a positive identifier would be applied to a web resource that (a) actually mentions the user 205 (or user's search terms 295), (b) is information that the user has authorized at some point in time and, (c) includes information favorable to the user while a negative identifier is something that is either unsolicited, unauthorized, or in some way provides the user harm such as defamation, libel, or infringement, for example. Depending on the user and the intended use of the bibliography 220, it may be useful for the user (or user's agent or third party) to emphasize the positive or negative categories and group and selectively display accordingly.

Turning now to FIG. 6A, an exemplary search term data table 290 stored in the database 133 located on the hard drive 128 on the DBS 122 is shown. In this exemplary embodiment, the search term data table includes a number of data entry slots including a search term code (for each search) data entry slot 293, search term (first name, last name) data entry slot 295, a search term included keywords (other included) data entry slot 297, a search term excluded keywords 299 data entry slot, a web resource category display indicator data (on/off switch for display in biblio page) entry slot 301, and a user account code data entry slot 248. The user account code may be used for linking a particular search term 295 (used to discover matching web resources 202) to a user profile table 230. The uncovered search terms may be forwarded to the reputation management system 100 for processing during the reputation management process as will be described in more detail below.

Turning now to FIG. 6B, an exemplary web resource management data table 291, also stored in the database 133, is shown and is generally used for managing one or more web resource listings (search results) and associated content and relating them to a user profile table 230 and search term table 290 for use in the generation of display screens such as those shown in FIGS. 8-15. In this example, the web resource data management table includes data entry slots for the following: a web resource unique identifier 292, a web resource short title 294, a web resource short description 296, a web resource URL 298, a web resource IP address 300, a web resource datetime stamp 302, a web resource prime category indicator (e.g., New, Unsorted, Me, Not Me) 304, a web resource secondary category indicator 306, a web resource snapshot 308, a web resource order/ranking identifier 314, a web resource remove/change indicator 316, a web resource comment 318, a positive/negative indicator 320, and a user account code 248. It will be appreciated that the user profile data table 230, search term table 290, and web resource management data table 291 are all linked in the database 133 by the common user account code 248. The data may be entered into the appropriate slots or each data slot in the table may contain a link to another location where the actual data is stored. Data stored in the database may be in the form of text, objects, and XML packets describing the web resource 202.

By selectively accessing the data stored in the web resource management table 290, the reputation management system 100 may be actively directed to manage one or more web resources 202 for further processing to build the bibliography display page 220 as will be described in more detail below.

The Program Modules (Detailed):

With reference to FIGS. 2-3, the program modules 111, 131, and 151 will now be described. FIG. 2 generally diagrams the location and interactivity of the program modules. For example, the Account Service Module (ASM) is generally identified as module A and is stored on the PWS 102 (FIGS. 1-2) as indicated by the 1A reference in the module box in FIG. 3. In addition, the ASM interacts with Modules B and C, the Email Service Module 192 and Database Service Module 190, respectively. The rest of the module relationships for program modules A-H are broken out in a similar manner with a "2" indicating the DBS 122 and a "3" indicating the EMS 142. These relationships will now be described in more detail.

The Account Service Module (ASM):

The Account Service Module 180 is a set of one or more program routines or computer instructions stored on the hard drive 108 of the PWS 102. The PWS CPU 104 may selectively perform the following functions as instructed by the ASM: a) checking for duplicate usernames (234, 236) and creating new account tables 230 if the username is available; b) creating a secure SSL connection over the network 170 for paying customers 205 electing to enter credit card information as payment for using the RMS 100; c) creating a secure SSL connection for all customers 205 electing credit card authentications of their name; and d) providing login and authentication routines using a conventional Facebook Connect API to validate the user. A unique eleven (11) digit alphanumeric user identification code 250 (FIG. 4) may also be generated by this routine. This code 250 is used for providing unique identifiers related to the authenticity and/or level of account access of the user 205 to determine those functions and displays available to the user. For example, if the authentication code indicates a free user or limited access account, then the user may be limited in functionality to generating only an initial search result display screen and not have access to further result managing tools provided by the RMS 100. Another unique five (5) digit numeric code 248 (FIG. 4) may also be generated and used for providing unique user accounts or profiles and is used for linking together the user profile data table 230, the search term data table 290, and the web resource management data table 291 as this code appears in each of these data tables. This enables the RMS to tie in a particular set of web resource listings (search results) and the search terms 295 used in obtaining those listings to a particular user profile 230 to generate a particular user's bibliography 220.

The Account Service Module 180 typically interacts with the Email Service Module 192 for sending out all or a portion of the authentication code 250 over the network 170 to the end user 205 by email. The user in turn may then access the RMS web site and input the authentication code to activate a subscription. Depending on the code, the ASM determines the type of account available to the user (e.g., free, basic, standard, premium, family, corporate). The Account Service Module 180 further interacts with the Database Service Module (DBSM) 190 to check the user profile data table 230 in the database 133 stored in the DBS 132 for duplicate user names and profiles.

Email Service Module (ESM):

The Email Service Module 192 is another set of routines or computer instructions stored on the hard drive 148 of the ESM 142 in this exemplary embodiment. When instructed by the ESM, the EMS CPU 144 may perform the following selectively executable functions: a) sending out activation email to new customer 205 signups; b) sending out welcome emails to new customer signups; c) sending out email alert notices to users 205 who have monitoring service enabled; d) sending out email notices for community forum topic replies and comments; e) sending out email notices for users with specific web resource monitoring service enabled; and f) sending out email notices for login reminders.

The Email Service Module 192 may communicate with the Account Service Module 180 to perform user activations and welcome email notices and is also in communication with the Monitoring & Alert Service Module 188 for sending out notices and alerts regarding new/unsorted web resources 202 uncovered during the periodic updating process described below.

The Database Service Module (DBSM):

The Database Service Module (DBSM) 190 is a set of one or more routines or program instructions stored on the hard drive 128 of the DBS 122 and executable by the Database Server processor 124. The DBSM has the following selectively executable functionality: a) creating, updating, and deleting customer account profiles 230; b) creating, updating, and deleting searched keyword(s) 295, 297, 299 associated with user account profiles 230; c) creating, updating, and deleted web resources 202 found when searched and associated to a search term 295, 297, 299; d) creating, updating, and deleting user prime category 256 designations of web resources 202 as ME, NOT ME; e) creating and modifying comment memos (e.g. 468a, 468b in FIG. 12) for each web resource 202; f) creating and modifying public bibliography page 220 profile headers (e.g, headline 520, city 522, state 524, country 526 in FIG. 14); and g) creating and updating web resource case files (web resource data management tables 291) for saving and monitoring of page/resource content on a set periodic basis as defined by the RMS manager or end user 205.

Figure 8:
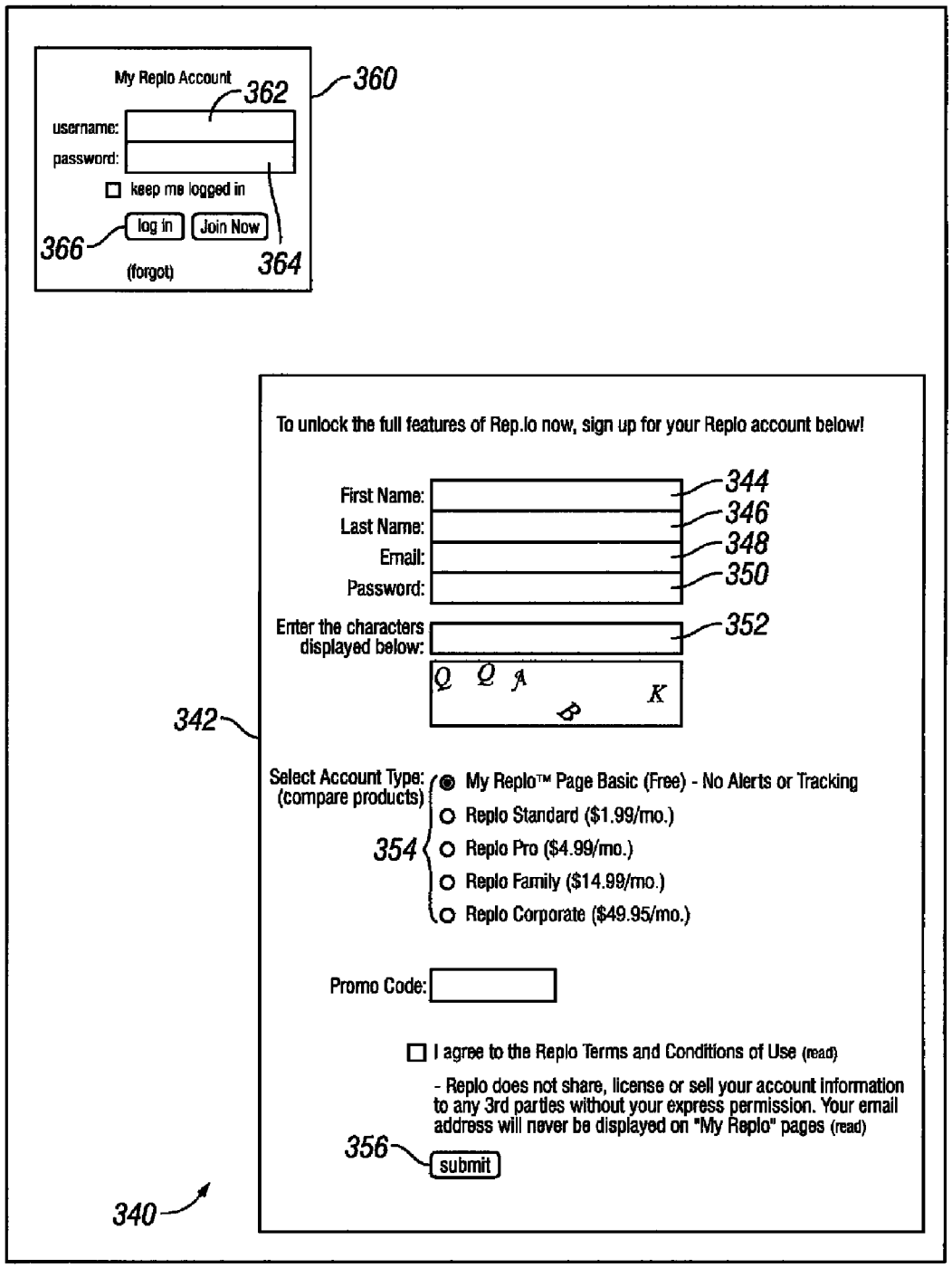
FIG. 8 is an exemplary screen shot of a user account creation and login display prepared by the RMS of FIG. 1.
Figure 14:
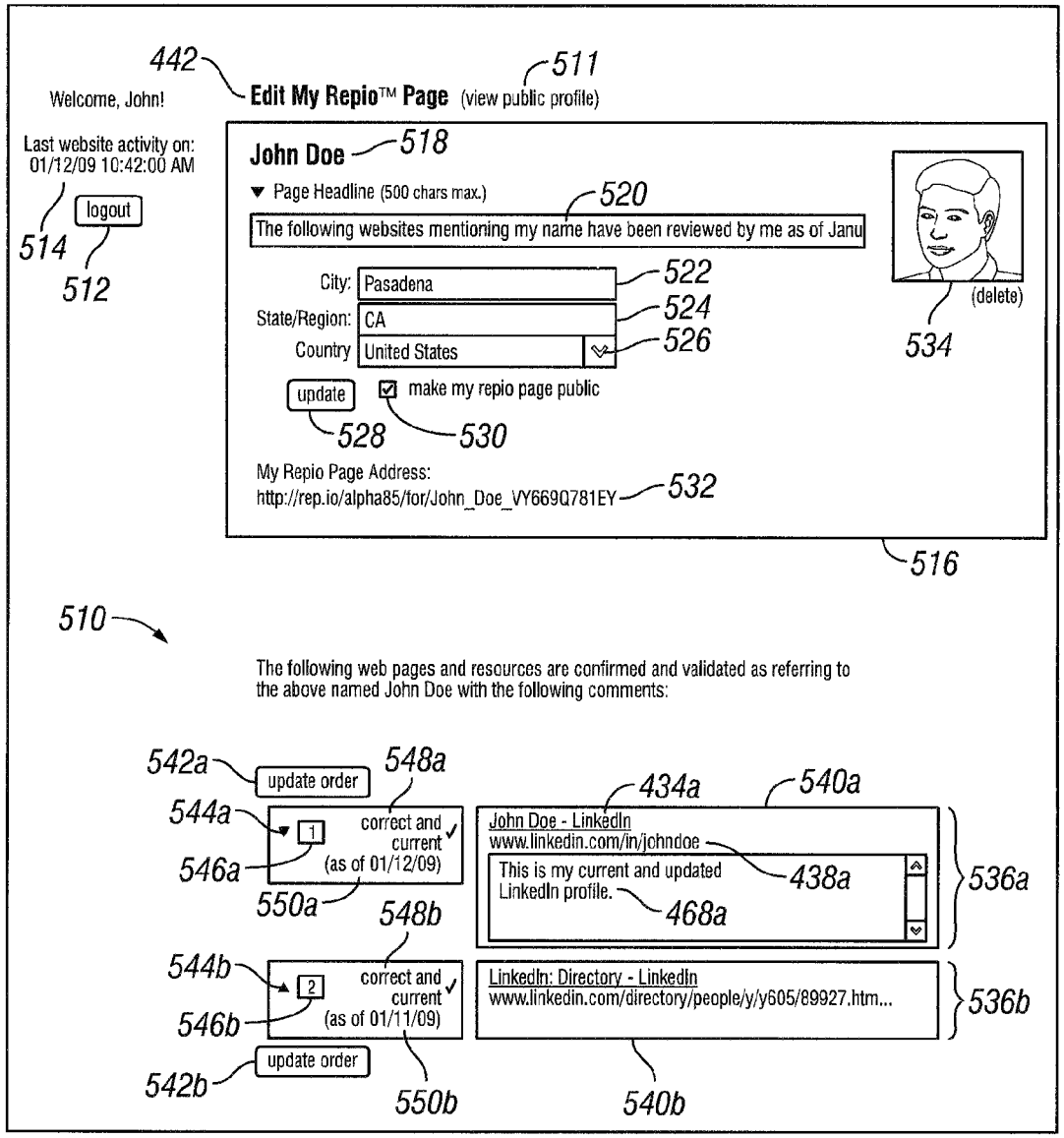
FIG. 14 is an exemplary screen shot of an editable user profile page and associated search results listings prepared by the RMS of FIG. 1.
Figure 15:
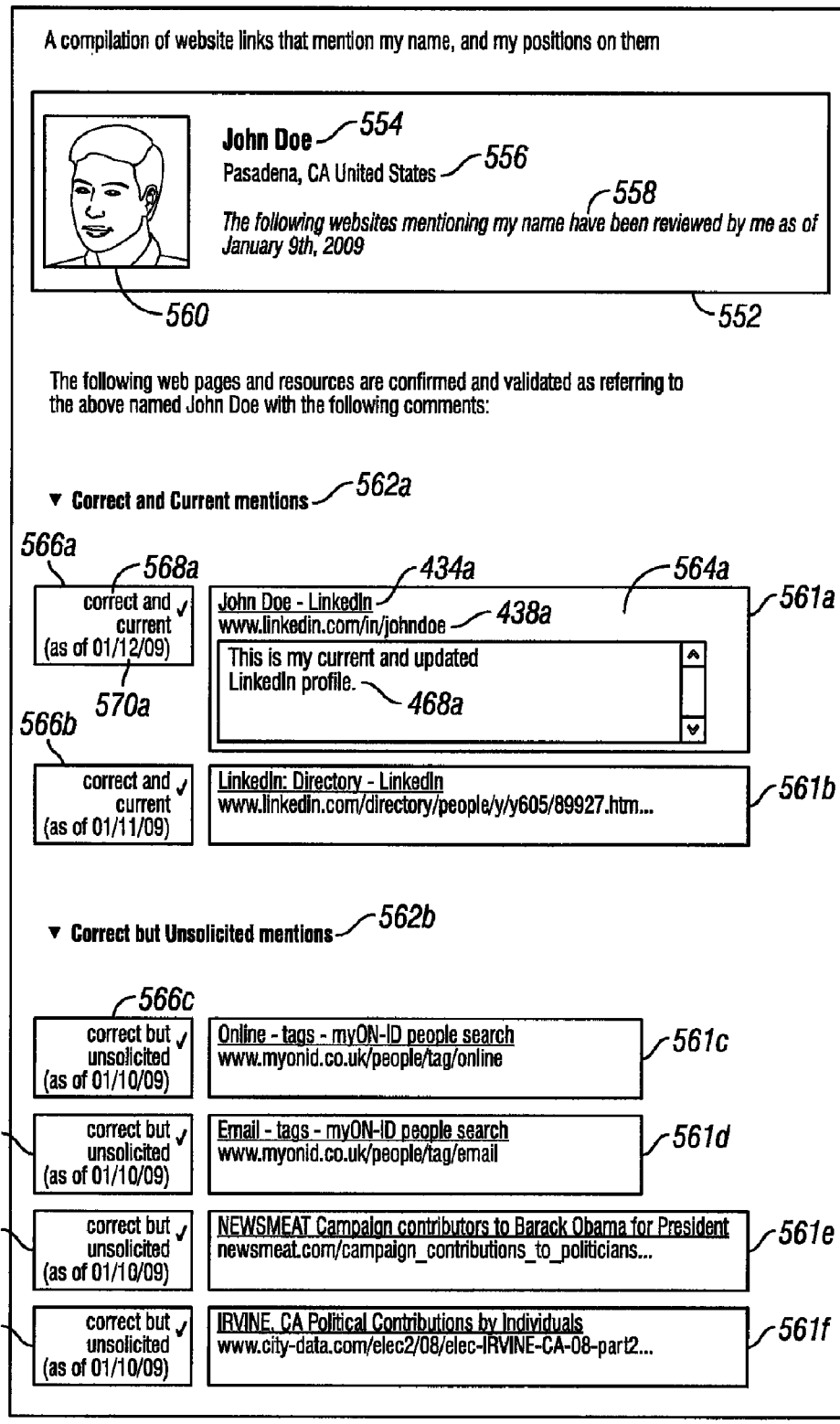
FIG. 15 is an exemplary screen shot of a publication ready bibliography processed by the RMS of FIG. 1.

The Database Service Module 190 interacts with the Account Service Module 180 for account activation and creation routines to support generation of the user profile table 230 and related display screens incorporating user profile data (e.g., FIGS. 8, 14-15). The DBSM further interacts with the Email Service Module 192 for sending out notices and email, the Data Search Module 182 to provide saving/retrieving/deleting data as requested by the end user 205, the Categorization Service Module 184 for web resource 202 management, the Display Service Module 186 for retrieving web resource data, and the Monitoring and Alert Service Module 194 for providing validation of web resources searched or checked.

The Data Search Module (DSM):

The Data Search Module 182 is a set of one or more program routines or computer instructions stored on the hard drive 108 of the PWS 102. When accessed by the PWS CPU 104, the DSM is programmed to provide the following selectively executable functionality: a) performing queries on data feeds 200 for matching results to search terms; b) filtering for web resources 202 identified and saved in the database 133 by a user 205 previously; c) creating a unique a new identifier record 292 for each web resource found, regardless of redundancy by multiple feed data sources; d) creating a unique display query (e.g, FIGS. 9-10) for the end user 205 to interact with new/unsorted web resource results (listings such as 416a-e for example); and e) providing a routine for filtering by including keywords 297 and excluding keywords 299.

The DSM 182 interacts with the Database Service Module 190 for saving web resource listings 416a-e resulting from search terms (keywords 295, 297, 299) inputs by the user, interacts with the Categorization Service Module (CSM) 184 for providing new/unsorted web resources 202, interacts with the DPSM 186 for displaying search results information, and further interacts with the MASM 188 for alert/notice services.

The Categorization Service Module (CSM):

The Categorization Service Module (CSM) 184 is a set of one or more program routines or computer instructions stored on the hard drive 108 of the PWS 102. When accessed by the PWS CPU 104, the CSM is programmed to provide the following selectively executable functionality: a) referring to the Category lookup table 232 (FIG. 5) and marking whether or not a web resource 202 belongs to a user 205 by using the Prime Category indicator 256 (Me/Not Me) (see FIG. 5); b) saving and updating secondary categorization indicators (descriptors) 262 (FIG. 5) for items identified as belonging to a user 205 (i.e., falling into the Prime ME category); c) saving and marking a web resource 202 as an item to be specifically monitored by the MASM 188; d) saving and updating an ordinal (ranking) 314 of web resources 202 for display by category on bibliography (bibliography page) 220.

The CSM 184 interacts with the DBSM 190 for saving and updating web resources 202 identifiers, interacts with the DSM 182 for providing a routine for sorting/organizing links, and interacts with the DPSM 186 for allowing displayed items to be categorized/sorted.

The Display Service Module (DPSM):

With continued reference to FIG. 3, the DPSM 186 is a set of one or more program routines or computer instructions stored on the hard drive 108 of the PWS 102. When accessed by the PWS CPU 104, the DPSM is programmed to provide the following selectively executable functionality: a) retrieving saved web resource 202 data and rendering the retrieved web resource for display on a web page (pulling from the original source); b) retrieving results from data feed APIs 200 and rendering the search results (e.g., web resource listings 416a-e) for display on one or more web pages 382 (FIG. 9); c) retrieving data for user account information from the user account data table 230 (FIG. 4) and displaying the data on the web page 340 (FIG. 8); d) retrieving data for building the user profile from the user account data table 230 (FIG. 4) on edit profile page 520 or bibliography page 220 for display on a web page (FIGS. 14-15; e) retrieving reporting data for traffic on bibliography page; f) retrieving saved detailed snapshots 308 (FIG. 6B) of individually tracked web resources 202 for display on web page; and g) retrieving information saved for community forum posts and displays on web page.

Figure 9:
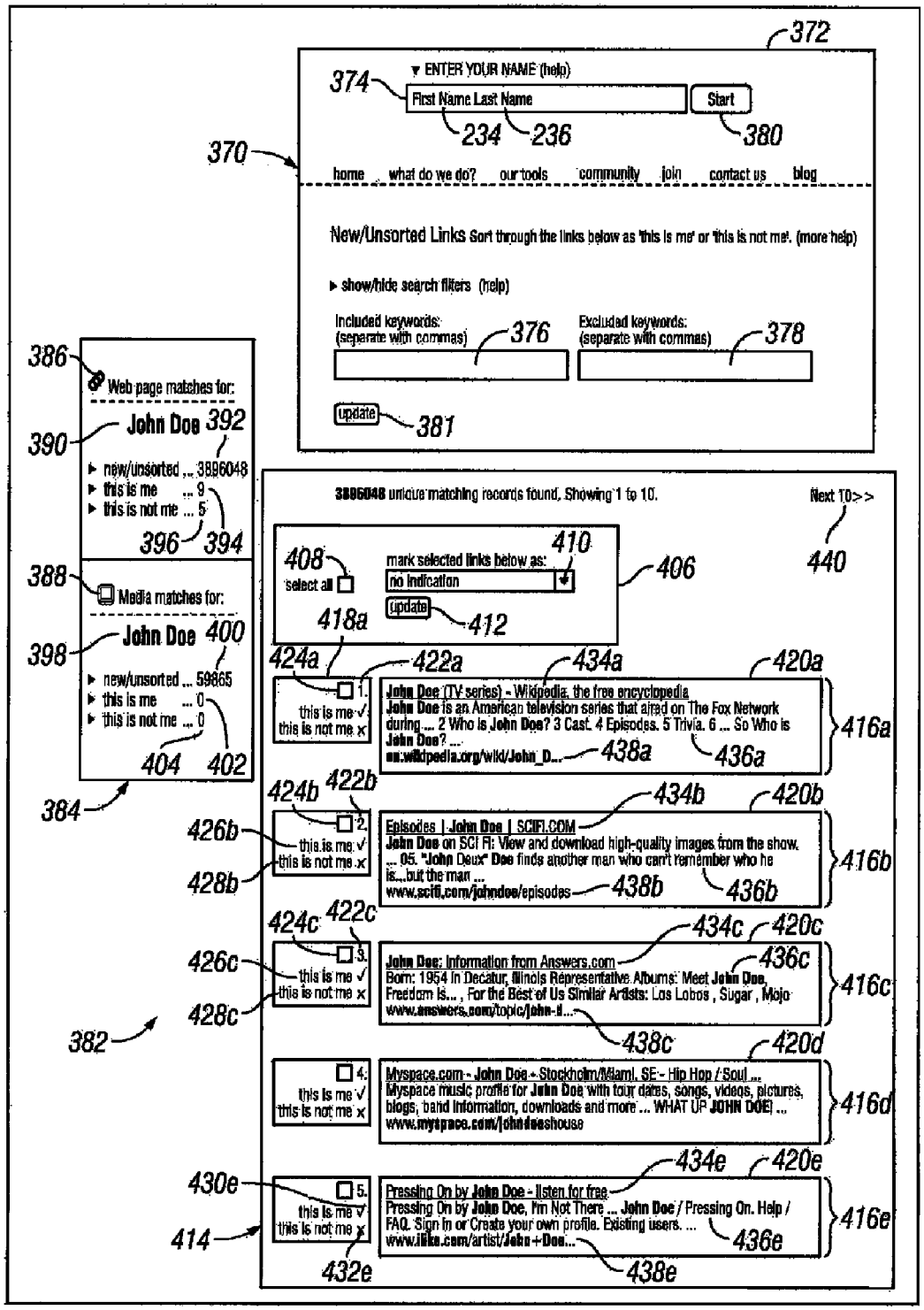
FIG. 9 is an exemplary screen shot of a search initiation form and search results display prepared by the RMS of FIG. 1.
Figure 10:
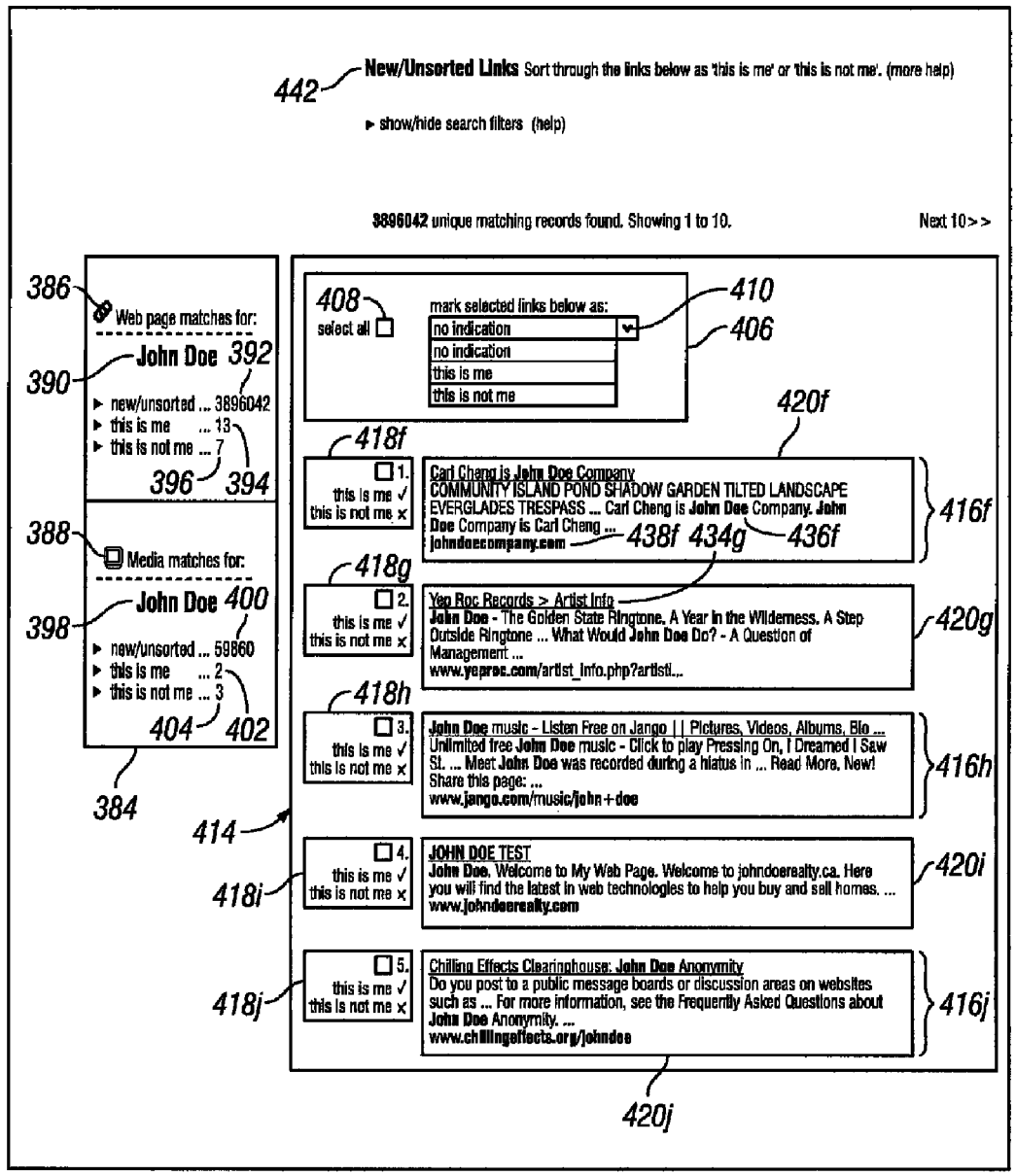
FIG. 10 is an exemplary screen shot of new/unsorted search result listings prepared by the RMS of FIG. 1.
Figure 11:
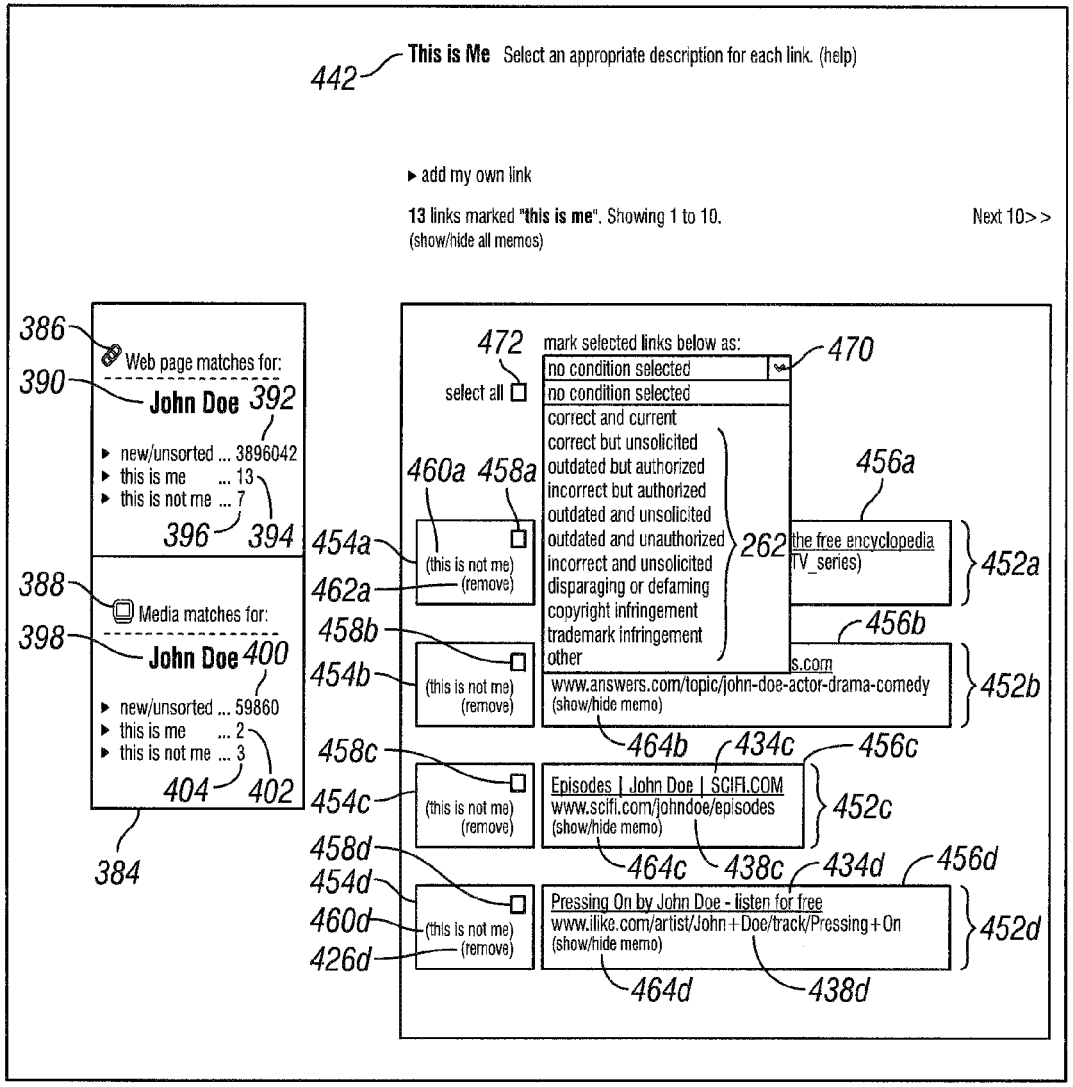
FIG. 11 is an exemplary screen shot of search result listings sorted into a primary category of user relevant listings in preparation for secondary categorization prepared by the RMS of FIG. 1.
Figure 12:
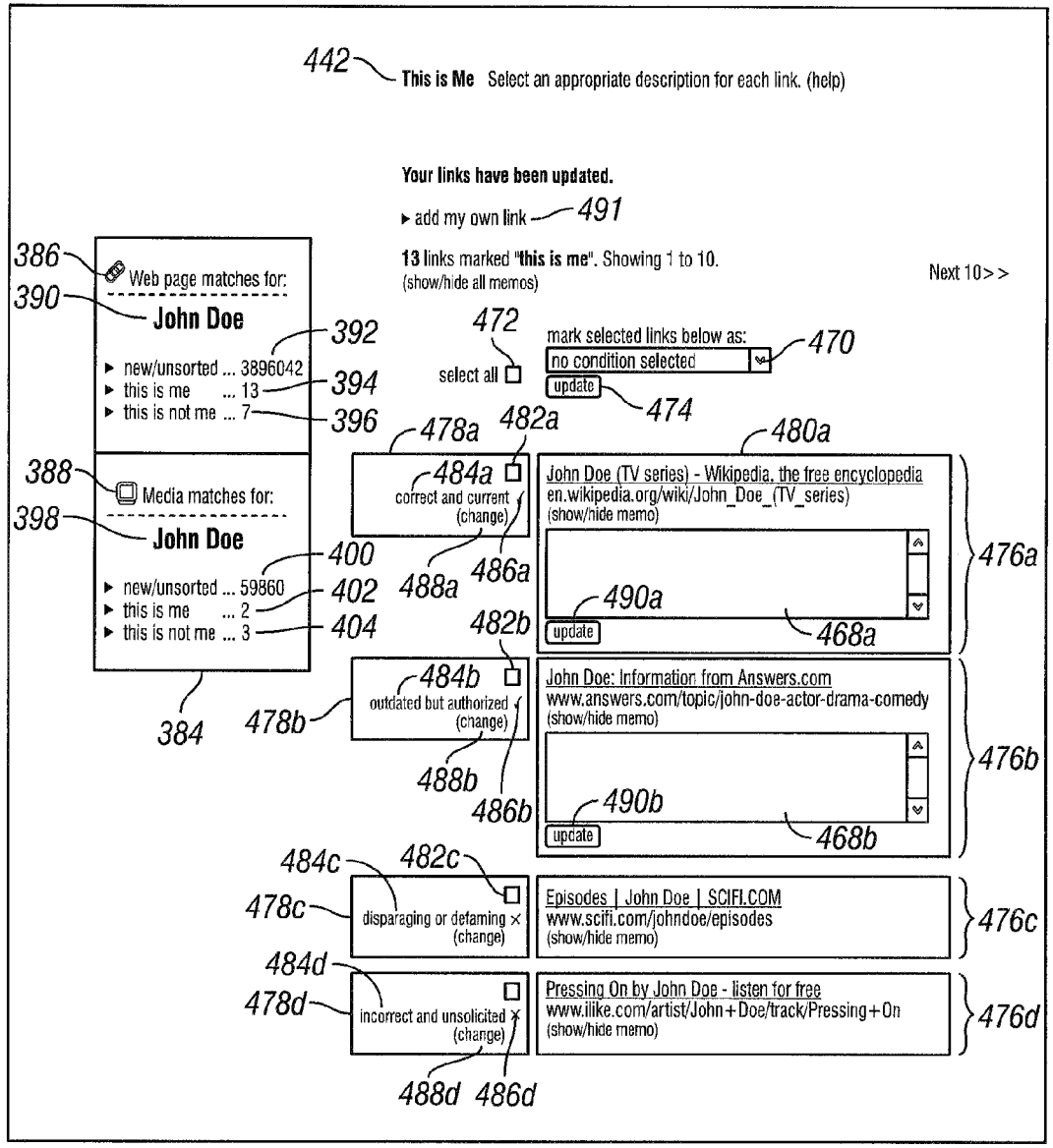
FIG. 12 is an exemplary screen shot of search results listings sorted into secondary categories prepared by the RMS of FIG. 1.

To perform the above-listed functionality, the DPSM 186 interacts with DBSM 190 for retrieving saved data from the database 133 for display, interacts with the DSM 182 for displaying data feed API 200 results, and interacts with the CSM 184 for displaying a graphical interface (web page) for categorization (e.g., items 406 in FIGS. 9, 10 and item 470 in FIGS. 11-12).

The Monitoring and Alert Service Module (MASM):

The Monitoring and Alert Service Module (MASM) 188 is a set of one or more program routines or computer instructions stored on the hard drive 108 of the PWS 102. When accessed by the PWS CPU 104, the MASM is programmed to provide the following selectively executable functionality: a) running regular system service and running queries on appropriate data feed sources 200 for deltas (changes in data or a difference in a new/unsorted count) to a last scanned result count and alerting user; and b) checking saved web resources 202 and saving snapshot of web resource data when available. A snapshot may be saved as a jpeg image of the screen or all web markup data (such as HTML, XHTML, XML) that constitute the web resource 202.

The MASM 188 interacts with the Email Service Module 192 on the EMS 142 for sending out email notices regarding search results 416a-e, particularly new and unsorted search results, interacts with the DBSM 190 for checking against saved web resource 202 data, and interacts with the DSM 182 for search retrieval and tracking.

The Remote Screen Capture Service Module (RSCSM):

The Remote Screen Capture Service Module (RSCSM) 194 is a set of one or more program routines or computer instructions stored on the hard drive 148 of the EMS 142. When accessed by the EMS CPU 1144, the RSCSM is programmed to provide the following selectively executable functionality: a) taking screen snapshots from a RMS browser plug-in (a downloadable software application installed on Microsoft Internet Explorer or Mozilla Firefox web browsers) and saving the result 308 (FIG. 6B) into a user's account; b) creating a record 308 of source of capture along with the datetime stamp 302, IP address 300, and URL 298.

The RSCSM 194 interacts with the DBSM 190 for saving remote capture information, and interacts with the CSM 184 for categorizing saved web resources 202.

The Bibliography Page:

Referring to FIGS. 1 and 15, the output to the end user or user's agent or third party RMS subscriber 205 may be in the form of an actively managed and selectively publishable bibliography page or pages 220 (physical or digitally represented online) formed by compiling and organizing one or more listings of web resources having a common theme based on user defined search terms. The bibliography is prepared by accessing the user account profile data table 230, the search term data table 290, and the web resource management data table 291 stored in the database 133. The bibliography page 220 is also a user managed page that has been generated using the search result (or reputation management) system 100 and sorted and/or adjusted by the user 205. The RMS further provides the user with the ability to organize, modify, order, and comment upon the listings and publish notices to visitors. The included fields to be displayed on the bibliography page 220 as generated from data appearing in the user profile table 230, the search term table 290, and the web resource management data table 291 are: first and last name 554 (prepared from the data 234, 236 in the user profile table 230), city, state, country as designated 556 (prepared from the data 238, 240, 242 in the user profile table), profile headline 558 (prepared from the data 246 in the user profile table), photo uploaded of user 560 (prepared from the 244 in table 230), a list of ME/NOT ME subsets of web resource 202 listings 561a-f (from the web resource data management table 291) further sorted by link categories 256, 262 (from table 232). Preferably, the user may have the ability to select which web resource listings 561a-f will display or not and the ordering of the listings displayed as indicated by the web resource category display indicator 301 (FIG. 6A) and the web resource order/ranking 314 (FIG. 6B). In addition, the user may also have the ability to publish small memos/comments 468a (prepared from data 318 in table 291) for each web resource listing, and the ability to publish one paragraph notice (prepared from data 257 in table 230) to visitors to the user's RMS web page.

In addition, the output 220 to the end user is available as an XML API served through DBS 122 directly to a client computer 204 or server. The access and availability to such XML API for published bibliography pages 220 requires authentication through verification tokens submitted through an XML API request. For further clarification, the DBSM 190 provides the XML API service and includes the ability to pre-filter the results of the XML API based on RMS 100 defined keywords for varying categories of XML API users including but not limited to industry specific adaptation of the RMS or component services powered by the embodiment (For example, an HR manager specific search module of bibliography pages 220).

Use of the Reputation Management System:

In general terms, a user 205 may use the GUI 206 and input device 208 of a client side computing device 204 having a conventional web browser to access the search result (or reputation management) system 100 website, presented through a series of interactive display screens such as those exemplified in FIGS. 8-15, and collectively maintained and offered by the PWS 102, DBS 122, and EMS 142 acting in cooperation and connected to the Internet 170. All user data input through the GUI is forwarded to the RMS for processing. Upon accessing the RMS website using conventional web browsing techniques, the user may conduct an online mention-based search based on, for example, the user's first name and last name (or other user defined keywords) submitted to the RMS by the user and stored in the data slots 295, 297, 299 in the search term table 230). The first time the user goes through these steps, the search effort results in the RMS generation of an initial (or baseline) search results set (web resource listings such as 416a-e in FIG. 9) acquired using conventional data feeds 200 (as well as user-submitted custom RSS data feeds) available over the Internet 170 from a universe of web resources 202 matching the search request terms, i.e., in this example mentioning, referencing, or bearing the first name and last name or other user selected keyword terms. It will be appreciated that the web resources may be representative of real world physical items such as news articles, social commentaries, published papers, resumes, images of people, videos and video clips, sound recordings and sound bytes of an individual as recorded in a digital medium and made available on the Internet 170, as well as being representative of physical devices and objects having a network resource address and including content, tags, or other references searchable over the network.

The initial search results set may be transmitted from the PWS 102 to the user 205 and presented on the GUI 206 in the form of a new/unsorted listing of all web resources 202 (see 416a-e in FIG. 9) obtained by the data feeds 200 and matching one or more of the search terms in an order initially determined by the data feeds. This initial set is likely to include a listing referencing one or more web resources 202 matching one or more of the keywords. However, it is also likely that one or more of such listings may also be unrelated or irrelevant to the user's search terms or lack relevance to the bibliography the user is seeking to organize and/or publish. So, the user's first step after requesting the search or data feed results is typically to categorize or sort one or more of the individual web resource listings (416a-e) into one of two prime categories or sorting identifiers 256 (FIG. 5). More specifically, the user may selectively assign the ME category identifier 258 to those listings 416a-e that pertain to those web resources bearing the user's name (or other keyword) that are actually associated with the user, and selectively assign the NOT ME category identifier (or This is Not Me) 262 to those listings that pertain to those web resources bearing the user's name (the keywords) that are not actually associated with the user as, for example, belonging to another person with the same first and last name as someone named John Smith would likely encounter. The Prime Category assignments are submitted to the RMS by the user. Each web resource listing 416a-e (FIG. 9) is given a unique identifier 292 by the DSM 182 and those listings managed by the user and tagged with a prime category 256 on the GUI 206 are submitted to the RMS 100 by the user 205 for storage in the database 133. The unique identifier and the prime category assigned to a web resource listing are stored in the web resource unique identifier data entry slot 292 and the prime category data entry slot 304, respectively, in the web resource management table 291. The user's search terms are stored in the data entry slots 295, 297, and 299 as applicable and provided with a search term code 293 in the search term table 290 by the DBSM 190 and DSM 182.

Upon segregating the initial web resource matching listings into the Prime Categories 256, the user 205 may then via the GUI 206 and input device 208 using conventional web browsing techniques, further break down each listing in the relevant Prime Category set (those assigned the "Me" code 258) by assigning a more descriptive secondary category or secondary sorting identifier 262 from the category lookup table 232 (FIG. 5) to each listing. The assigned secondary categories are submitted to the RMS 100 by the user 205 and these secondary category indicators (264-284) are stored in web resource secondary category data entry slot 306 in web resource management table 291 in the database 133 in connection with each web resource remaining in the Prime Me Category 258. It will be appreciated that the secondary sorting identifiers 262 may be subsets of one or more of primary sorting identifiers 256 and by selecting a secondary sorting identifier, the primary sorting identifier will be selected by association. The user may be presented with both sorting identifiers 256 and 258 at the same time in the same display (or search results listing) and the selection of a secondary sorting identifier may be a time saving feature whereby an associated listing may be sorted by assigning a secondary sorting identifier and thus its top level primary sorting identifier at the same time resulting in a time saving feature. In other words, the sorting identifiers may be hierarchically related or tiered such that selection of a lower tier sorting identifier will result in the automatic selection and assignment of all higher tiered sorting identifiers to the associated search result or network resource listing.

In addition to tagging each web resource listing 416a-e with a secondary category 262, the user 205 may also via the GUI 206 and input device 208 enter a commentary (e.g., 468a in FIG. 12) associated with each web resource listing. Such commentary is also transmitted to the RMS 100 for further processing and storage in the RMS database 100.

During the search (or data feed) result management process, the user 205 may also selectively rank and order the web resource listings via the GUI 206 and input device 208. These rankings for each web resource listing are stored in the web resource order/ranking data entry slot 314 in the web resource management table 291 in the database 133. When the web resource listing has been categorized into the Prime Category 256 and the Secondary Categories 262, commented upon, and ranked in a preferential order by the user, the web resource listings represents a bibliography 220 or compilation of web resources associated with and commonly themed in accordance with the search terms provided by the user, although not all categorization, comment, and ranking processes must be conducted to produce the web resource listings. In the broader sense, the bibliography is a selected set of web resource listings compiled by the RMS 100 as instructed by the user 205 based upon a common principle, search terms, or subject as defined by the user 205. The user may then elect to publish some or all of the bibliography 220 over the Internet 170 or alternatively, transfer a copy of the bibliography to a digital medium such as a hard drive 214 or optical disc 212 associated with the user computer 204. The user may also elect to print out a hard copy of the bibliography 220 using the printer 216 in communication with the user computer 204. With the above overview presented, and referring now to FIG. 7 illustrating the process flow of the RMS 100 and further referring to screen shots of an exemplary RMS website as presented in FIGS. 9-15, a more detailed description of the RMS 100 in use will now be described.

Figure 7A:
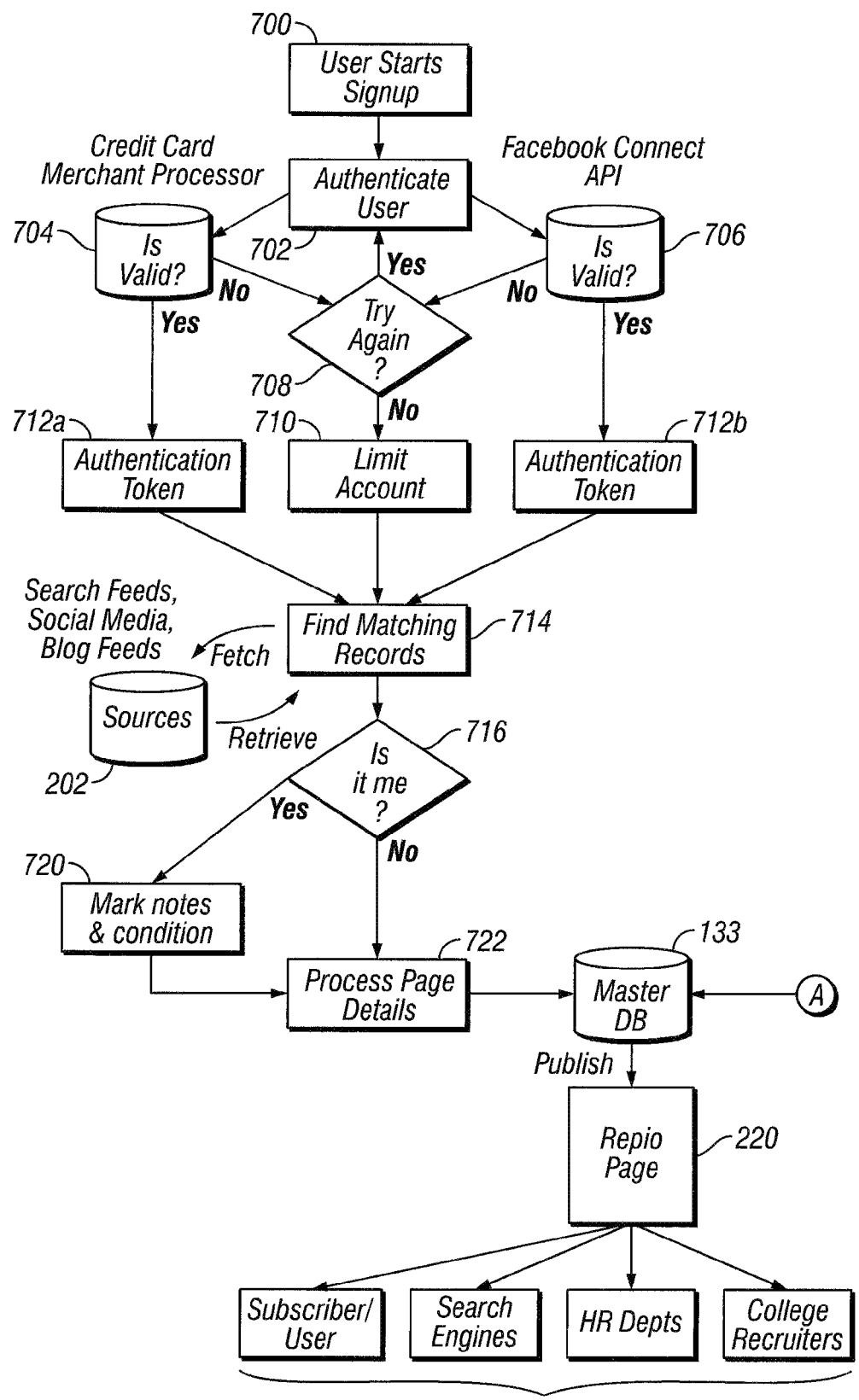
FIG. 7A is a portion of a flow diagram for using the RMS of FIG. 1.

Initial Account Setup:

Referring now to FIGS. 1-3, 7A, and 7B-8, the user may initially create a user account record 230 (FIG. 4) to be stored in the database 133 of the DBS 122. Thus, in the initial step 700 as shown in FIG. 7A, the user 205 (subscriber/account user/end user) (FIG. 1), using the GUI 206 and input device 208 of the client computing device 204 accesses the RMS website using conventional web browsing techniques. The user is then presented with an account setup and login page 340 such as that exemplified in FIG. 9. The account setup and login page includes an account creation entry block 342 that includes a number of data entry slots including a user's first name data entry slot 344, a user's last name data entry slot 346, a user's email address data entry slot 348, a user password data entry slot 350, and an automated computer signup prevention data entry slot 352 for receipt of human readable on-screen code (known conventionally as a CAPTCHA code). An account type button 354 and submit button 356 are also provided in the account creation block.

To continue the account registration process, the user 205 may enter the requested data and selections into the account creation block 342 on the account creation and login page 340 by typing in a user first name, a user last name, a email address, a password, on-screen CAPTCHA code in the corresponding data entry slots and further selecting an account type and then the submit button 356 using the input device 208. Once the submit button is selected, the data entered in the account creation block 342 will be transmitted from the client 204 to the PWS 102 via the Internet 170 and network lines (160 and 168). The account creation data is transmitted under direction of the PWS CPU 104 to the ASM 180 for further processing.

Continuing with step 700, assuming the on-screen CAPTCHA code is proper using conventional techniques, the ASM 180 (FIG. 3) receives the account creation data and accesses the database 133 on the DBS 122. The user first name 344, user last name 346, and email address 348 are compared by the ASM 180 to the existing user account records (tables) 230 in the database 133. If no duplicate records are located, then the ASM assigns a unique user account code (5 digit) to the new user 205 and cooperating with the DBSM 190 creates a new user account record 230 containing the user's first name 234, the user's last name 236, email address 253, password 255, and user account code 248 in the database 133. This database record/table 230 may be modified later as discussed below.

In an optional next series of steps starting at step 702, the ASM transmits an instruction for an authentication request to the ESM 192 stored on the EMS 142. The ESM CPU 144 processes the instruction according to the ESM 192 and transmits an email with an authentication code 250 to the user 205 email address over the Internet 170. Following the instructions in the email, the user 205 accesses the RMS website over the Internet and enters into the authentication procedure by following one or more processes to provide a better authentication of the user. The first process as shown in step 704 takes place over a conventional credit card merchant processor (not shown). The ASM 180 creates a SSL (secure socket layer) connection for a user electing credit card authentication of the user's name The user enters the user name and credit card information into the GUI and submits the information. Assuming the information is proper, an authentication code is generated. Alternatively, or in conjunction with, the user may also use an authentication method such as the Facebook Connect API, the OpenSocial API, OpenID API (or other alternative online ID login systems) for authenticating a user's identity (step 706).

Dependent on the information submitted and authentication processing results, the ASM generates an eleven (11) digit authentication code 250 and adds it to the user account record 230 in the database 133. The authentication code indicates the level of user access to the RMS website from a range of free, basic, standard, family, corporate accounts, for example If the user authentication fails, the user is queried to try again (step 708) and retry the authentication process. If the user elects to pass over the authentication process, the user account is designated accordingly in the user account profile record 230. If the user is not authenticated, then the account is limited (step 710), otherwise a user authentication code (token) 250 is assigned to the user 205 and stored in the associated user account profile (user account record/table) (step 712a, 712b).

With the initial account setup completed, the user is now ready to use the RMS 100 features as determined by the account level access.

Initial Use after Account Setup:

After the user is authenticated (assuming an authenticated user (AU) with a premium subscription), referring again to FIG. 7A illustrating a flow diagram for the process of using the reputation tracking, filtering, and classification system 100, the user 205 accesses the user account and login page 340 (FIG. 8) from the computing device 204 using conventional web browsing techniques. The login page as generated by the DPSM 186 on the user's GUI includes a login block 360 with a username (e.g., the user's email address) data entry slot 362, a password entry slot 364, and a login button 366. The user 205 enters the login information (username, password) in the corresponding slots using the data entry device 208 and then selects the login button 366. The username and password are transmitted to the ASM 180 of the PWS 102. The ASM accesses the user profile table 230 in the database 133 in the DBS 122 and compares the existing user profiles 230 (data base record) for a match. If a match is found, then the user 205 is presented with a main search page 370 generated by the DPSM 186 on the GUI 206 and the user is considered "logged in." If no match is found, the user is prompted to try again or is denied access to the RMS 100.

With reference now to FIG. 9, the main search page (web resource search screen) 370 as generated on the user's GUI by the DPSM 186 includes a keyword input block 372 with a first name last name data entry slot 374, and an optional included words data entry slot 376 and excluded words data entry slot 378 for further refining the search results. Initially, it is preferred that the user 205 merely enters his or her first and last name and conducts the search by selecting the start search button 380. If the user has a more common name or an unwieldy number of results are returned, then the optional included and excluded data entry slots 376, 378, respectively, may be used to add or exclude other keywords and may prove useful in paring down the search results to workable number. Either prior to the initial search or after the initial search is conducted, the user 205 may input words in either or both of the included keywords data entry slot 376 and excluded keywords data entry slot 378 and select a search update button 381 to refine the search results to take into account the additional search terms. The search terms input into the search data entry slots 374, 276, and 378 are given a unique search term code 293 by the DSM 182 and stored in the corresponding data entry slots 295, 297, 299 in the search term table 290 for the particular user profile code 248 associated with the user 205 by the DBSM 190.

Upon selection of the search button 380 by the AU 205, the search terms (first and last name, included/excluded terms) 295, 297, 299 are transferred over the network 170 to the DSM 182 in the PWS 102. The DSM queries one or more data feeds 200 (or user-defined custom RSS feed) over the network 170 for web resources 202 that have matching results to one or more search terms (step 714). Matching results (web resource listing sets) are each tagged with a unique identifier 292 by the DSM and transmitted to the DBSM along with a short title 294, short description 296, URL 298, and IP address 300 of the web resource 202 for entry into the RMS database 133 in the DBS 122. The initial search set is assigned a datetime stamp that is stored in the database 133 web resource datetime stamp data entry slot 302 (FIG. 6) to serve as a reference point to future searches. The DSM further interacts with the DSPM 186 to transmit a search results display page 382 (FIG. 9) to the remote user display device 206 that includes three main sections. The first section is a tally block 384. The tally block is divided into a web page match section 386 and a media match section 388 and appears on the left hand upper region of the search results display page 382. The web page match section includes a search terms used listing 390 displaying the terms used in the search. Set beneath the search terms listing is a set of vertically aligned counters including a new/unsorted tally counter 392 that includes a text description and a counter indicating the number of new/unsorted results found in the search based on the terms in the search term listing 390. The new/unsorted tally counter is set above a Prime Category Me counter 394 that is in turn set above a Prime Category Not Me counter 396.

With continued reference to FIG. 9, the media match section 388 also includes a search terms used listing 398 positioned above a new/unsorted media counter 400, a Prime Category Me counter 402, and a Prime Category Not Me counter 404. The media matches generally include photos and videos with matching search terms. Each counter 392, 396, 398, 400, 402, 404 also includes a short adjacent description explaining what the associated counter stands for. As the media matches are uncovered using a different search methodology altogether from the search methodology of the web pages matches, the total counter tally of the web pages plus the media matches equals the overall web resource listings (total hits) found in the search.

With continued reference to FIG. 9, positioned next to the tally block 384 is a Prime Category setting command block 406 that is generated by the DPSM 186 and includes a select all checkbox 408, a command dropdown box 410, and an update button 412. In use, a user 205 may simply select the checkbox 408 using the GUI 206 and then select a command from the dropdown box (no indication, This Is Me, This is Not Me), and select the update button and the selected command will be applied to all the search result listings. In addition, each search result listing 416a-e may be individually categorized (Prime) as described below.

Positioned on the search results listing page 382 (FIG. 9) beneath the command block 406 is a search results listing block, generally designated 414, including the results uncovered in the search by the data feeds 200 of the web resources 202 matching the search terms 295, 297, 299 input into the search block 372. The search results listing block 414 presents a vertically aligned group of search results listings 416a-e, one for each web resource. Each search results listing may be further broken down into a number of components.

The main listing includes a selection block 418*a-e* (only 418*a* is labeled) positioned to the left and horizontally aligned with a corresponding descriptor block 420*a-e*. Given the common layout of each search results listing 416*a-e*, the components of an exemplary search listing 416*a* will now be described. The selection block 418*a* includes a rank identifier 422*a* (number) next to a checkbox 424*a* that are set above a Prime Category This is Me activator link 426*a* that is set above a Prime Category This is Not Me activator link 428*a*. A checkmark 430*a* appears next to the This is Me Activator link indicating that this is a positive or relevant indicator while an "X" 432*a* appears next to the This is Not Me activator link indicating that this is negative or irrelevant indicator.

Still referring to FIG. 9, the descriptor block 418*a* includes a short title descriptor 434*a*, a short description 436*a* associated with the web resource 202, and a web resource online address or network location identifier (URI, URN, URL, IP address, domain name, web page address) 438*a*. Both the short title descriptor and the web resource online address are preferably in the form of a hyperlink so that a user 205 may simply select the link and be directed to a display of the actual web resource that was the result of the search and caused the search result listing to appear. It will be appreciated that the actual content or reference associated with the search result may or may not be stored by the system 100 depending on contractual arrangements or copyright status regarding the content.

The search results listings 416*a-e* are typically displayed in a set number per page and additional pages may be accessed using conventional web browsing techniques such as by selecting a next page, next group, or next number button 440. The displayed data is generated on the user's GUI by the DPSM 186 in response to a search request submitted by the user and by accessing the corresponding data contained in the web resource management table 291 in the database 133 that is stored for each web resource identified in the user's search in cooperation with the DBSM 190.

It will be appreciated that in this exemplary embodiment, a search for the first name "John" last name "Doe" has been requested and the results shown in FIG. 9. If an initial search has not yet been executed, the tally block counters will all read "0" and the search results block 414 will contain no listings.

As shown in this example, the user 205 input the first name "John" and last name "Doe" with no addition keywords as indicated in the tally block 384 search term listing 390. The data feeds 200 returned 3,896,048 web page matches (web resources) as indicated by the new/unsorted tally counter 392 and 59,865 media matches (also web resources) as indicated by the new/unsorted tally counter 400. At this point, the user has yet to tag each search result listing 416*a-e* with a Prime Category as indicated by the This is Me counter 394 and This is Not Me counter 396 although some web resource listings may have been tagged in an earlier search session as indicated by the Me/Not Me counters have readings other than "0" as shown in FIG. 9.

Referring to FIGS. 7A and 9-10, turning to the next step in the process (Step 716), the user 205 may use the main command block 406 or the individual selection blocks 418*a-e* (only exemplary 418*a* indicated) next to each search result listing 416*a-e* to perform an initial division of the search listings into two Prime Categories 256 (FIG. 5): Me (This is Me) 258 for those search results listings that do pertain to the user and Not Me (This is Not Me) 260 for those search results listings that do not pertain to the user. For example, the user may simply select the select all checkbox 408 in the main command section 406. This will result in all of the checkboxes 424*a-e* (only 424*a-c* designated) all receiving a checkmark indicating that all search results listings 416*a-e* have been selected. The user 205 may then select the command dropdown box 410 and highlight the desired command (This is Me or This is Not Me). The highlighted command will display in the dropdown box. The user may then apply this Prime Category 256 to all of the selected search listings 416*a-e* and the results are stored in the web resource management table 291 in the web resource prime category slot 304 in the database 133 by the DBSM 190.

Alternatively, the user 205 may selectively apply a Prime Category or primary sorting identifier 256 to individual search result listings 416*a-e*. For example, the user may select a Prime Category command link 426*a-e* (only 426*b-c* designated) to assign a Me category indicator to the corresponding search results listing 416*a-e* or 428*a-e* (only 428*b-c* designated) to assign a Not Me category indicator to the corresponding search results listing.

A third way to apply Prime Category assignments to search listings results 416*a-e* is to check one or more checkboxes 424*a-e* and then select the Prime Category command from the dropdown box 410 and select the update button 412. Using this approach, the selected Prime Category command will be applied only to those search results listings 416*a-e* that have been selected as indicated by a checkmark in the corresponding checkbox 424*a-e*. A user could also select the select all checkbox 408 to select all search results listings and then select individual checkboxes 424*a-e* to unselect the corresponding listing and then apply a Prime Category assignment command from the dropdown box 410 as well. The use of selection boxes and dropdown boxes are well known browsing techniques and would be understood by those of ordinary skill in the art.

Referring now to FIG. 10, the user 205 has assigned Prime Categories 256 to a number of search results listings 416*a-e* from FIG. 9 and this is indicated in the tally block 384 in FIG. 10. As shown in this exemplary screen shot in FIG. 10, the new/unsorted counter 392 has decreased by 6 while the This is Me counter 394 has increased from "9" to "13" and the This is Not Me counter 396 has increased from "5" to "7" indicating that the user has processed 6 search results listings 416*a-e* from FIG. 9 by assigning the listings a Prime Category. The new/unsorted counter 392, 400 indicates those search results listings that have yet to be assigned a Prime Category. As shown in FIG. 10 those search results listings 416*a-e* (FIG. 9) that have been assigned a Prime Category have been removed from the New/Unsorted page that is indicated by the Category title 442. Instead, the user 205 is presented with a page of new/unsorted group of search results listings 416*f-j* presented in a similar manner as the original search results listings in FIG. 9. The user may elect to assign more Prime Categories to these new/unsorted search results listings and update the assignments. The tally block will change accordingly and the results again stored in the database 133.

For any of those search results listings 416*a-j* (FIGS. 9-10) that are assigned the Prime Category 256 of This is Not Me 260, these listings are saved to the database 133 in the Web Resource Management Data Table 290 (FIG. 6) and the Web Resource Prime Category indicator 304 is marked accordingly. Such irrelevant web resources may be excluded from further display or processing (step 722). Of course, the user 205 has the option of accessing these search results listings 416*a-j* by selecting the This is Not Me tally counter 396 (or 404) that acts as a link to the This is Not Me search results listing page (not shown). The user has the option to change the Prime Category similar to the process for the Me search results listings described next. The user may also elect whether or not to display such web resource listing on a private or public bibliography 220.

The tally counters 392, 394, 396, 400, 402, and 404 are all active links that may be selected by the user 205 on the GUI 206 using the input device 208 in a conventional manner. For example, the user may select the This is Me counter 392. The associated command is sent to the DPSM 186 that accesses the database 133 and returns a This Is Me display page 450 as exemplified in FIG. 11.

With continued reference to FIG. 11, the user 205 is presented with a subset of the search results listings 452a-d from the initial search that have been categorized by the user into a Prime Category 256, in this instance, the Me category 258. The overall number of results presented (in one page or multiple pages) matches the This is Me tally counter 394. These Prime Category relevant search listings have a similar format to the new/unsorted search listings with the following modifications. The Me listings 452a-d include a modified selection block 454a-d and a modified Descriptor Block 456a-d. The modified selection blocks include a checkbox 458a-d, a This is Not Me change command link 460a-d, and a Remove command link 462a-d. By selecting a This is Not ME change command link, the user may modify the Prime Category assignment associated with the corresponding search results listing 452a-d. In addition, the user may remove the search results listing from the database 133 altogether by selecting an associated Remove command link. Changes are saved in the web resource management table 291 in the database 133.

The modified Descriptor Block 456a-d includes the same short title 434a-d (only 434 c-d designated) and URL 438a-d and further includes a show/hide memo link 464a-d that contracts or expands a text comment box 468a-b (FIG. 12). The narrative 436a-d from the earlier page 382 (FIG. 9) may or may not be displayed in the Descriptor block. In this example, it is not displayed.

With continued reference to FIG. 11, a secondary assignment dropdown box 470 and a select all checkbox 472 are provided above the Me search results listings 452a-d. The secondary assignment dropdown box includes selectable listing of each of the secondary categories 262 in the Category Lookup table 232 (FIG. 5). An update button 474 (FIG. 12) is similar to the update button 412 for the Prime Category assignment dropdown box 410 in FIGS. 9-10 and operates in a similar manner.

At this point, the user 205 may further refine the categorization of each relevant search results listing as well as add a comment adjacent each listing. Using the secondary assignment dropdown box in conjunction with the select all checkbox or individual selection boxes 458a-f associated with each Me search listings 452a-d, the user 205 may assign a secondary category 262 from the Category Lookup Table 232 (FIG. 5) to all of the Me search listings or individual Me search listings as follows. More specifically, the user may, through the GUI 206, select all of the Me Search results listings 452a-d by selecting the Select All Checkbox 422 to highlight all of the individual selection boxes 458a-d. If a particular Me search listing is to be excluded from this global secondary category assignment, then the user may unselect the particular Selection box 458a-d to uncheck this box. Any secondary category assignment will be ignored for the corresponding Me Search Results listing 452a-d.

With at least one Me Search Results listings 452a-d selected, the user may then select the secondary category dropdown box 470 and highlight one of the secondary categories listed, in this example, No condition selected (will leave search results 452a-d unchanged), Correct and current 264, Correct but unsolicited 266, Outdated but authorized 268, Incorrect but authorized 270, Outdated and unsolicited 272, Outdated and unauthorized 274, Incorrect and unsolicited 276, Disparaging or defaming 278, Copyright infringement 280, Other (or user defined) condition 282, or Takedown 284. Once the selected secondary category is highlighted by the user, the user may select the update button (not shown) on the GUI 208 and the highlighted secondary category will be applied to all Me search results listings 452a-d that have their associated Selection Box 458a-d selected (as indicated by a check mark). Alternatively, the user may select an individual selection box 458a-d and assign a secondary category 262 using the secondary category dropdown box 470 and update button 472.

In this example, only one secondary category may be assigned to a search results listing 452a-d, however, each individual ME Search results listing 452a-d may be designated the same or differently from other search results listings as determined by the user 205 and the application of multiple secondary categories is contemplated.

With the secondary categories 262 applied and updated to the Me search results listings 452a-d (FIG. 11) and stored in web resource secondary category data slots 306 in the web resource management data table 291 in the database 133 of the DBS 122 by the DBSM 190, the user 205 is presented with a secondary category applied search results listing page, generally designated 475 (FIG. 12), as generated by the DPSM 186, and may further comment upon each search results listing. Referring still to FIG. 12, a set of secondary categorized search results listings 476a-d are displayed. These listings are similar to earlier described search results listings 416a-e and 452a-d but with some modifications. The secondary category applied search results listings 476a-d includes an Command and Category label box 478a-d and a modified Descriptor Block with a comment box 480a-d. The Command box 478a-d includes a checkbox 482a-d, a secondary category label 484a-d, a positive/negative indicator 486a-d and a change command link 488a-d. The modified Descriptor Block 480a-d includes the short title 434a, the URL 438a, the show/hide memo button 464a, and a comment box 468a for receipt of text entry by the user 205 via the GUI 206 and input device 208, and an individual update button 490a-d (only 490a-b designated).

The user 205 may further refine descriptions to the secondary category 262 applied search results listings 476a-d by entering in text into the associated comment box 468a-d (only 468a-b designated in FIG. 12) and selecting the associated update button 490a-b. The updated commentary is stored in web resource comments data slot 318 in the web resource management table 291 (FIG. 6B) in the database 133 by the DBSM 192. The user may also highlight one or more individual selection boxes 482a-d and used the secondary category assignment dropdown box 470 and the update button 474 to change the secondary category applied to any search listing. A positive/negative indicator 486a-d in the form a checkmark or "X" indicates the potential impact to the user's reputation. Such indicators may be color coordinated as well such as a green checkmark and a red "X".

It will also be appreciated that the user's display may be updated after each sorting category is assigned or after the user selects an update option. Display tabs corresponding to the sorting identifiers may conveniently be used to sort and display the user's selections. For example, selection of a tab corresponding to an assigned sorting identifier will result in a display of all search results matching the tab identifier. The user may also determine which search results matching certain sorting identifiers are displayed. For example, all search results matching the Me/Outdated but authorized sorting categories and further tagged or sorted as Images may be selected for display while all search results matching the Me/Outdated but authorized sorting categories and further tagged or sorted as Video will not be displayed.

Referring now to FIGS. 12-13, for the convenience of the user 205, a user defined network location identifier or link may be added to the search results and managed as above. By selecting an Add my Own Link command link 491 (FIG. 12), the user is presented with an Add my Own Link page 492 (FIG. 13) with an add my own link command block 494. The command block 494 includes a title data entry slot 496, a web address data entry slot 498, a set of secondary category application buttons 500 with individual buttons corresponding to each secondary category 262, and a submit button 502. The user may using the GUI 206 and input device 208 enter a descriptive title, web address, highlight a secondary category, and the select the submit button to add the information into the web resource management data table 291 in the database 133. The new data will be assigned a unique web resource identifier code 292 and stored in the web resource management data table 291. Once the search results listing display (414, FIG. 9) is updated by the DPSM 186, the new web resource listing (e.g. 416a-e) will appear on the display and may be managed along with the other web resource listings. This situation may be useful when a user knows about a particular web resource that for some reason is not caught in the global search by the data feeds or may appear to low in the results display that this provides a quicker way of entering the data.

Further organization is provided by the RMS 100. Referring now to FIGS. 14-15, a private bibliography user edit page, generally designated 510, wherein a user may edit user account details stored in the user account profile 230 (FIG. 4) and order/rank the search results listings previously obtained to define the bibliography page 220. This page is accessible through a link 442 on a main account management page (similar to the page showing Edit My Account, FIG. 14 or through a my account link as shown in FIG. 14). The Edit Account Detail and Ordering Page 510 includes the familiar page descriptor 442, in this case the "Edit Bibliography Page", next to a View my Public Profile activation link 511 that will display the bibliography page 220 on the user GUI 206 when selected, a logout button 512 on the left hand side beneath a user last visit indicator 514 that indicates the last time the user visited the RMS 100 web site. The logout button simply logs the user out of the RMS 100.

Positioned next to the logout button near the top of the Edit Page 510 is a user account edit block 516 containing data entry slots pertaining to at least some of those stored in the user profile table 230. In this exemplary embodiment, there is a username header 518 pertaining to the user 205 set above an editable bibliography page headline data entry slot 520. Just below the headline slot is a city data entry slot 522, a state data entry slot 524, a Country dropdown box 526, an Update button 528 and a public viewing checkbox 530. Set beneath the update button and checkbox is a bibliography page address slot 532 including the URL to the bibliography page. To the right of the editable header in the Edit Block 516 is a user image 534. The data in this edit block is all obtained from the user profile table 230 in the database 133. The user may enter the appropriate new data in the corresponding edit block editable slot and select the update button 528 to transmit the new data to the database 133 to modify the user profile table 230.

In addition, the user 205 may also select whether the bibliography page 220 at the URL indicated in the bibliography page address slot 532 is available to the public by checking the public viewing checkbox. If the box is unchecked, then the bibliography page 220 will not be made available to the public at that URL over the network 170 but a private version will still be available to the user under a My Page link such as that shown in FIG. 14. It is also contemplated that portions of the bibliography page may remain private or public instead of the entire bibliography.

Below the edit block 516 are the current search results listings 536a-b that will be used to generate a private or published bibliography page 220. Each listing includes a Ordering Block 538a-b and a Descriptor Block 540a-b. Each Ordering Block includes the following: an update order button 542a-b, an up/down position button 544a-b, a rank number data entry slot 546a-b, a secondary category descriptor 548a-b, and a timedate stamp 550a-b. The Descriptor Block 540a-b includes a short title 434a-b, a URL 438a-b, and a comment box 468a-b. This information is generally what is displayed on the private or public profile 220.

In use, the user 205 may either use the up/down position buttons 544a-b to move a listing 536a-b up or down relative to the other listings. Alternatively, the user may input a preferred order into the rank number data entry slots 546a-b and select an update order button 542a-b to request the listings 536a-b be reordered according to the ranking provided by the user. In this manner, the user may proactively manage the display order of the search results listing on the public profile bibliography page 220. The result of the user's selections are stored in the web resource management table 291 in the database 133 for subsequent recollection and/or modification.

It will be appreciated that a user 205 may select the short title 434a-b or URL 438a-b to send a request over the network to the web resource provider to send the display back to the user's GUI 206. Thus, the user may always go straight to the source of the search listings and view for his or her own determination prior to or after assigning prime and secondary categories and adding comments to any of the listings.

To check the publicly available version, the bibliography page 220, the user may select the view my public profile link 511. A request for the public profile page 220 will be generated by the DPSM 186 and displayed on the user's GUI 206 as shown in FIG. 16. This is the same page that will be accessible to the public at the URL listed in the URL box 532 in the edit block 516 (FIG. 14). The exemplary bibliography page 220 includes a user profile block 552 that includes a username 554, a city, state, and country line 556, a page header 558, and a user image 560, all taken the user profile table 230 (FIG. 4) as created and/or modified by the user 205.

Beneath the user profile block 552 are a set of sorted, commented upon, web resource listings 561a-f organized by secondary category 262 as indicated by the secondary category headers 562a-b. The listings are organized and ordered by default or by the user 205 as determined on the user account and bibliography edit page 510 (FIG. 14). Each listing 561a-f includes a Descriptor block 564a-f with a short title 434a-f, URL 438a-f, and comment box 468a-f. Next to the Descriptor block is a categorization and status block 566a-f having a secondary category description 568a-f and a currency indicator 570a-f that indicates the last time the link was updated. The secondary category description should match the secondary category header 562a-b of the section in which the listing appears.

Publication of the bibliography page 220 may take place by one or more of the following: printout from a printing device 216, as a printable or viewable file stored on a storage medium 210 or 214, or via access to the page over the network 170. In summary, from a universe of web resources containing content available over a network, a subset of web resources based on content pertaining to a particular user (Me set) is parsed from the larger set, within this subset each web resource is categorized further by accuracy and authorization, and then further ordered by display preference by the user, the results of which may be commented upon and published in part or in their entirety for viewing and access by a third party or maintained privately and the two versions do not have to match.

The Monitoring and Alert and Updating Feature

Figure 7B:
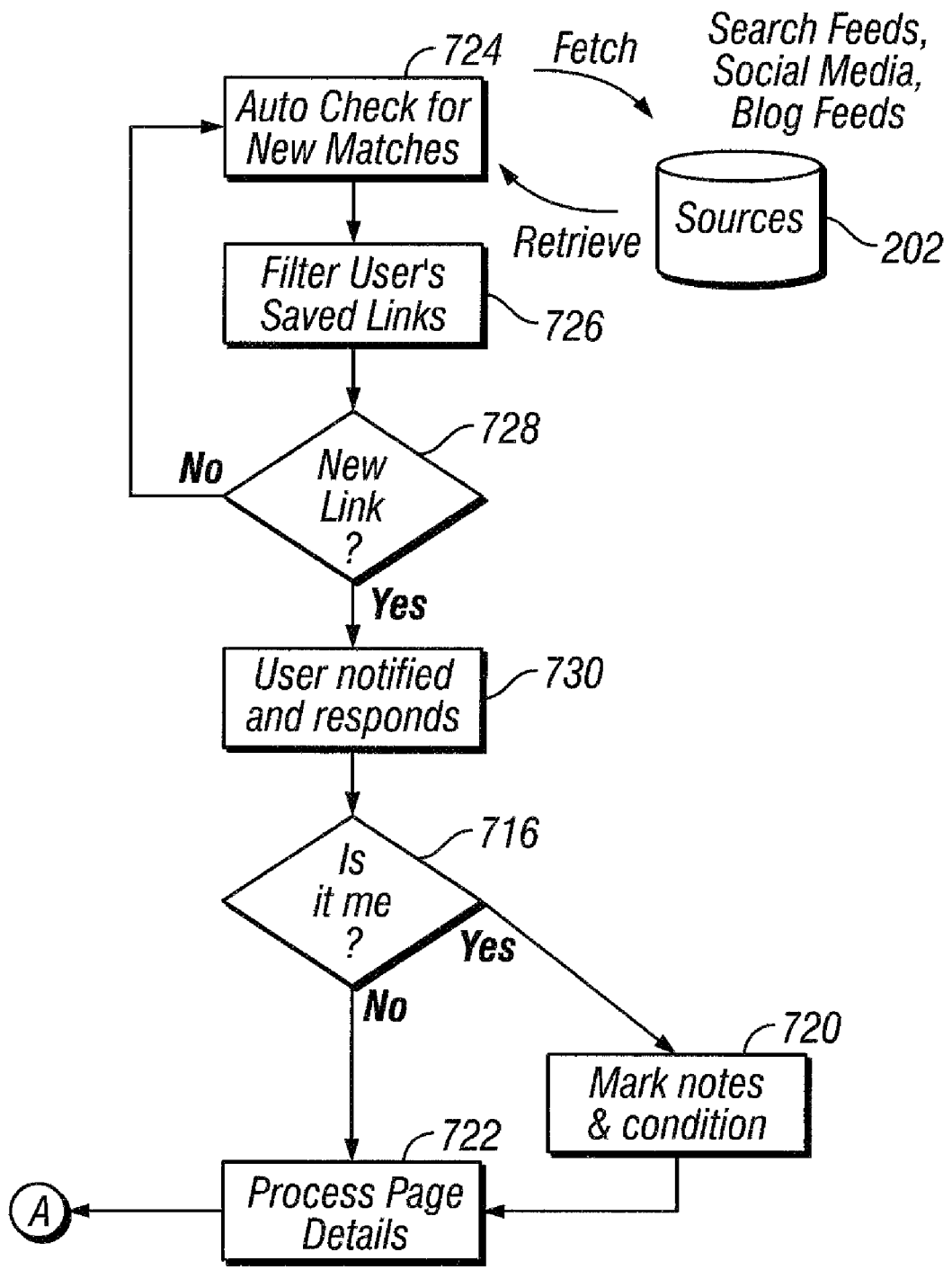
FIG. 7B is a continuation of the flow diagram of FIG. 7A.

With an initial, baseline, or prior set of Me web resource listings 561a-f (FIG. 15) categorized by the user 205 and stored in the database 133, it will be appreciated that it will be useful to periodically update, either automatically or manually, the bibliography 220 given the ongoing daily addition of digital content and network identifiable physical objects accessible online on the network 170. Referring now to FIGS. 2, 3, and 7B, assuming the user has selected or subscribed to a monitoring type of account, the EMS 142 may be programmed by the MASM 194 to conduct a continual or periodic query on available (selected) data feed sources 200 for changes (deltas) compared to a prior query or scan using the pre-stored search terms in the user profile table 230 (FIG. 4), typically the user's first name and last name or other keywords used to establish the baseline bibliography page 220 (step 724 in FIG. 7B). After receiving an updated set of web resources 202 from the data feeds 200, the MASM 194 saves a snapshot of the content of each web resource in the web resource management table 291 and assigns a unique identifier 292 to each updated web resource 202. The MASM then accesses the web resource management data table 291 (FIG. 6B) and filters through those web resources previously stored in the database 133 and linked to the user's account 230 (step 726). A comparison between the updated web resource content discovered in the monitoring process to the current web resource content already stored in the database 133 from prior search efforts is made and if a delta (any change in content or sourcing) is determined by the MASM, a new web resource determination triggers an instruction to be sent by the MASM to the ESM 192 in the EMS 132 (step 728).

With continued reference to FIGS. 1-3 and 7B, the Email Service Module 192 generates an email in response to the new web resource determination and transmits it over the network 170 to the user's mailbox according to the email address 253 stored in the user profile table 230 (FIG. 4). The email alert notifies the end user (subscriber) 205 that there are new/unsorted web resources to review or existing web resources have been modified in some manner (step 730). The subscriber 205, using the remote computing device 204, logs in to the RMS 100 web site and selects the new/unsorted web resource link 392 or 400 such as that shown in FIG. 11 to display the new/unsorted web resource listings. The user may then perform the same routines (steps 716, 720, and 722) as for the baseline (assigning Prime and Secondary Categories, Adding Comments, and Ranking Display Orders) using the RMS 100 as described above for the baseline set of web resource listings. Any new changes to web resources may be saved in the web resource management data table 291 in the database 133 by the DBSM 190 to serve as a new updated baseline set. Continually or periodically monitoring and notifying the user continues as determined by the setting in the RMS 100 enabling the user 205 to actively monitor and manage the user's bibliography page 220. The continuous or periodic setting may be stored in one of the data tables 230, 290, 291 stored in the database 133 and referred to by the MASM 188 to initiate the updating process.

Practical Applications:

From the foregoing, it will be appreciated that a user or business entity 205 may actively manage a large universe of web resources 202 by conducting a global search of the Internet 170 or other network using any of the available network data feeds 200 (including any user submitted custom RSS data feeds) applied to one or more search terms such as first name, last name, brand identifier, or other keywords to obtain an initial set of web resources matching the requested search terms. Specific data feeds and/or network resources may also be selected. This initial set may be refined further into two or more Prime categories or sorting identifiers, those that are relevant (e.g., Me or My Brand) and those that are irrelevant (e.g., Not Me or Not My Brand) to form an initial or baseline working set of web resource listings (also referred to as search results, search results listings, or data feed results) that may be further categorized into secondary categories providing even more description of the web resource content. Additional tiers of sorting categories may also be used for more sorting and display control. Additional comments may be added to the listings and the listings may be ordered and ranked according to the preference of the user. The user may then selectively publish a bibliography or compilation of search result listings with the categorization and commentary authorized by the user in a preferential order of display and having a common theme as determined by the user (or user's agent or third party). Individuals and business seeking to monitor their reputations and/or brands online as well as information seekers such as college recruiters, professional recruiters, human resource (HR) managers, and others requiring background check information about an individual or business may benefit from using the RMS 100 and reviewing the associated output, the bibliography 220 of an individual or business entity.

The data, including historical web resource snapshots, and search results obtained and stored and authentication process undertaken using the RMS 100 may form the launching pad and provide the requisite proof for a number of activities including the facilitation of takedown requests and infringement actions. Reputation based activities such as insurance coverage and pre-paid legal plans may take advantage of the RMS in support of their respective activities.

In addition, it is contemplated that the RMS may be useful for screening out non-compliant materials during the hiring process, scoring and/or rating network sites, their advertisers, those posting content, and other users based on frequency and response times to takedown requests or posting of certain categories of content, and/or memorializing a compilation of web resource listings for historical purposes. Bibliographies may be sorted by either positive or negative factors or a combination of both and presented as the user sees fit.

Various bibliography pages 220 may also be compiled according to user defined criteria and grouped around a common theme, including, but certainly not limited to reputation or branding.

Modifications and Appreciations

It will be appreciated that a single computer with the capacity equaling the three servers described herein will suffice and be a workable alternative. In other words, in a network environment, the program modules and database may all be resident on a single web server and accessible to one or more processors. Related to this, while the above-reference exemplary embodiment was described in terms of a client-server architecture, other suitable network architectures includes peer-to-peer and cloud computing types would be suitable for providing a network environment over which the RMS may operate. In addition to being accessible over the network on a free or subscription basis, the RMS program modules and/or database may be downloadable over the network or loaded onto a portable digital storage device such as a hard drive, flash drive, optical disc, tape drive, or other conventional digital storage medium as a set or individually for implementation on a user's server or computing device system having the capability of running the program modules and/or database. Similarly, the XML data structure for the bibliography may be accessed, downloaded, uploaded, or transported in any of these fashions as well. If the available digital content is available to data feeds on a smaller scale such as a standalone computer, the network related components may not be necessary.

As links to web resources are tracked, web sites may be rated in accordance with the tendency to list improper references to an individual. For example, those sites having a high occurrence of correct but authorized or incorrect categories associated with them would be rated poorly while those sites having fewer or none of these indicators would be rated highly. In addition, based on aggregate information of user identified Prime Categories and Secondary Categories, a rating and ranking system for the user 205, network resource 202 or content provider of such network resource 202 is contemplated in this embodiment. The data collected and the bibliographies created by the RMS may also be used to support a community of users for collectively discussing and implementing tools for impacting their reputation online.

As Internet enabled physical objects such as appliances, digital paper, nano-manufactured disposable devices and products become prevalent, to the extent these items are (a) identifiable on the Internet and (b) are found to contain matching descriptors as the search terms identified with a user 205, references to these objects shall also constitute an identified network resource 202 covered in this embodiment.

While the Prime Category described in this embodiment use the terms This is Me and This is Not Me, it will be appreciated that changes to the labels for the relevant and irrelevant Prime Categories may be made to the invention without departing from the scope of spirit of this embodiment. For example, Approved/Not Approved, Relevant/Irrelevant, Match/No Match may also be used as suitable primary category identifier pairings. Other user defined terms found suitable to the user defined search terms may also be used. Related to this, while specific labels are demonstrated for the Secondary Categories 262 in FIG. 5, it will be appreciated that changes to such labels may be made to the invention without departing from the scope of spirit of this embodiment. As to the flexibility and adaptability of the RMS interface, it will be appreciated that the Prime Categories and Secondary Categories may be tailored to the user's needs. For example, an HR manager screening for potential employees may elect to use the Prime Categories: Beneficial (to the applicant)/Harmful (to the applicant) and Secondary Categories such as Applicable Experience, Applicable Credential, Positive Review, Positive Insight, Positive Personal, Useful Contact, Competitive Advantage, Accomplishment, Awards, Other Beneficial. Once the categories are applied to the search results obtained by the HR manager, the bibliography may be forwarded to the applicant for response and commentary, particularly for any "harmful" labeled listings. Other suitable interfaces and categories may be used as well to sort out working sets of search results in an effort to build the bibliography of compiled listings responsive to the user's search terms, categorization, commentary, and ordering.

In addition, it will be appreciated that by actively managing one's reputation online and assembling proof (snapshots) of inappropriate commentary/references, a process for submitting a takedown request would be facilitated, particularly by an authenticated user.

It will further be appreciated that the bibliography discussed herein and associated results screening would be of particular use to human resources representatives to support hiring practices, college recruiters, both scholastic and athletic, and search engines. In effect, the reputation management system allows a user to take control of one's own name and the content associated with it by preparing for take downs, or offering a preferential order of display, or allowing authenticated user commentary to each incident (mention) of content.

While the embodiment discussed has primarily been discussed in terms of user name keywords, the RMS 100 could easily be expanded to encompass other keyword searches and be useful for brand (or other information and content) monitoring by businesses and individuals. As such, the RMS performs not just as a reputation or brand management system but as an information, content, link, or search result management system based on user selected criteria. As mentioned above, the RMS user interface is easily adaptable to present Prime and Secondary Categories tailored to user defined criteria and/or a number of category templates may be offered over the RMS to suit a variety of information and content management scenarios.

While the problem discussed herein resides primarily on the Web and the preferred embodiment described herein is structured in terms of handling this process over the Web, this is not meant to be limiting in any manner as local area and wide area networks, ranging from publicly accessible to internally managed private networks, may incur the same problems and incorporate the same system to handle these reputation issues. More specifically, the term WWW, Internet, Web, LAN, WAN, and network should all be deemed interchangeable.

While the embodiment discussed primarily publishes the bibliography page 220 through the PWS 102, the same information is also accessible through an XML API available from the DBS 122 for third party entities using pre-assigned security access tokens. The information available through the XML API represents a portable data format for the bibliography page 220.

While the present invention has been described herein in terms of a number of preferred embodiments, it will be appreciated that various changes, uses, and improvements may also be made to the invention without departing from the scope and spirit thereof.

What is claimed is:

1. A system for managing a set of search results available from one or more digital content resources using one or more data feeds accessible over a network having at least one graphical user interface, the system comprising:
 a network interface operable to communicate with the network when coupled thereto;
 at least one processor coupled to a memory and in communication with the network interface, the processor, in response to receipt of a user generated search request defined by one or more search terms, being programmed to:
  using at least one data feed over the network, retrieve one or more individual search results with each result including a network location identifier associated with one or more digital content resources matching at least one user provided search term;

determine whether any duplicate sets of network location identifiers are retrieved in response to the user generated search request;

assign the individual search results a user unsorted status;

transmit the individual search results including only one network location identifier from any duplicate sets along with a user assignable primary sorting identifier over the network for display on the user's graphical user interface;

upon receipt of at least one primary sorting identifier from the user for at least one individual search result, revise the user unsorted status of the corresponding individual search result to a user sorted status; and transmit a revised display of the individual search sets in accordance with the corresponding status and user assigned primary sorting identifier for display on the user's graphical user interface.

2. The system as set forth in claim 1 further including:

a storage device having a database in communication with the processor, the database being structured to store an initial baseline set of individual search results along with a corresponding user assigned primary sorting identifier and a search result sorting status; and wherein the processor is further programmed to:

periodically search the one or more network resources using at least one of the data feeds to generate one or more periodic search results;

update the database with any periodic search results that differ from those individual search results previously stored in the database; and notify the user over the network when the database is updated.

3. The system as set forth in claim 1 wherein:

the processor is further programmed to:

transmit the individual search results along with at least one user assignable secondary sorting identifier;

upon receipt of at least one secondary sorting identifier from the user for at least one individual search result, transmit a revised display of the individual search results in accordance with the corresponding user assigned secondary sorting identifier for display on the user's graphical user interface.

4. The system as set forth in claim 1 wherein:

the user assignable primary sorting identifier includes a first category corresponding to the relevancy of the individual search results and a second category corresponding to the irrelevancy of the individual search results for selection by the user.

5. The system as set forth in claim 2 wherein:

the database is further structured to receive and store a user generated comment for at least one individual search result.

6. The system as set forth in claim 1 wherein:

the processor is further programmed to:

retrieve a set of individual search results excluding one or more user provided search terms.

7. The system as set forth in claim 1 wherein:

the processor is further programmed to:

query the user for an authentication code prior to retrieving one or more individual search results.

8. The system as set forth in claim 1 wherein:

the processor is further programmed to receive a user generated ranking of the individual search results; and transmit the search results as ranked by the user for display on the user's graphical user interface.

9. The system as set forth in claim 1 wherein:

the individual search results include selectable network location identifiers wherein the user may display the digital content of the network resource associated with the network location identifier.

10. The system as set forth in claim 1 wherein:

the processor is further programmed to:

transmit for user authorized publication a listing of sorted, unique individual search results in accordance with the primary and secondary sorting identifiers and a ranking order assigned by the user.

11. A computer implemented method of managing a set of search results available from one or more network resources using at least one data feed over a network having at least one graphical user interface, the method comprising:

providing a processor coupled to a memory and a network interface operable to communicate with the network when coupled thereto; and using the processor for:

retrieving at least one matching search result in the form of a network location identifier from the network resources using one or more data feeds over the network in response to a user generated search defined by one or more search terms; determining whether any duplicate sets of network location identifiers are retrieved in response to the user generated search;

transmitting a listing of the one or more search results with only one network location identifier from any duplicate sets along with a primary sorting identifier for each search result for display on the graphical user interface;

receiving a selected primary assorted identifier from the user for at least one of the search results;

upon receipt of at least one primary sorting identifier from the user for at least one individual search result, revising the user unsorted status of the corresponding individual search result to a user sorted status; and transmitting a revised display of the individual search results in accordance with the corresponding status and user assigned primary sorting identifier for display on the user's graphical user interface.

12. The computer implemented method as set forth in claim 11 further comprising the steps of:

providing a storage device with a database in communication with the processor and constructed to store a baseline set and at least one updated set of one or more search results, each search result including a unique digital content link along with at least one user selected sorting identifier and a sorting status indicator;

storing the baseline set in the database; and storing one or more updated sets in the database.

13. The computer implemented method as set forth in claim 12 further comprising the steps of:

transmitting for display on the user's graphical user interface a user assignable secondary sorting identifier as a subset of at least one primary sorting identifier for each unique network location identifier; and upon receipt of the user selected secondary sorting identifier for at least one unique network location identifier, storing the user selected secondary sorting identifier with the associated unique network location identifier in the database for subsequent display of the search results in accordance with the selected secondary sorting identifier.

14. The computer implemented method as set forth in claim 11 further comprising the steps of:
receiving a display ranking of at least one search result from the user; and
transmitting an ordered display to the user for display on the graphical user interface in accordance with the display ranking.

15. The computer implemented method as set forth in claim 11 further comprising the steps of:
receiving a text comment for at least one search result from the user; and
storing the text comment with the at least one search result in the database.

16. The computer implemented method as set forth in claim 12 further comprising the steps of:
periodically retrieving one or more search results matching the user defined search terms;
updating the database with any periodic search results that differ from the search results stored in the database; and
notifying the user when the database is updated.

17. The computer implemented method as set forth in claim 11 further comprising the steps of:
receiving one or more exclusionary search terms from the user; and
removing any of the search results that incorporate the exclusionary terms prior to transmitting the search results to the user over the network for sorting.

18. A computer implemented method of managing search results available from one or more network resources using at least one data feed over a network having at least one graphical user interface, the method comprising:
providing a processor coupled to a memory and a network interface operable to communicate with the network when coupled thereto; and
using the processor for:
retrieving an initial set of user unsorted search results, each result matching one or more pre-defined search terms and including a digital content network identifier associated with the network resource matching at least one pre-defined search term;
determining whether any duplicate sets of network location identifiers are retrieved in the initial set of user unsorted search results;
transmitting for display on a user's graphical user interface only one network location identifier from any duplicate sets corresponding to at least one user unsorted search result along with the associated digital content network identifier and one or more user assignable sorting identifiers;
receiving at least one user assignable sorting identifier; and
transmitting a resorted display of the initial set of search results according to the at least one user assignable sorting identifier.

19. The computer implemented method as set forth in claim 18 further comprising the steps of:
periodically retrieving one or more subsequent sets of user unsorted search results; and
transmitting a notification to a user over the network indicating new unsorted links are available for sorting when a difference between a subsequent search result set and a prior search set is determined.

* * * * *